United States Patent
Humann et al.

(10) Patent No.: US 12,120,434 B1
(45) Date of Patent: Oct. 15, 2024

(54) SKY SENSOR DEVICE

(71) Applicant: Halio, Inc., Hayward, CA (US)

(72) Inventors: Christian Humann, Berkeley, CA (US); Walter Thomas Barnum, Salt Lake City, UT (US); John B. Bogdan, Logan, UT (US); Robert Don Bruhn, West Jordan, UT (US); Andrew McNiel, Oakland, CA (US); Michael Scott Moulton, Heber City, UT (US); Benjamin Nagel, Salt Lake City, UT (US)

(73) Assignee: Halio, Inc., Hayward, CA (US)

( * ) Notice: Subject to any disclaimer, the term of this patent is extended or adjusted under 35 U.S.C. 154(b) by 0 days.

(21) Appl. No.: 18/490,437

(22) Filed: Oct. 19, 2023

Related U.S. Application Data

(62) Division of application No. 17/650,655, filed on Feb. 10, 2022, now Pat. No. 11,831,997.
(Continued)

(51) Int. Cl.
*H04N 23/743* (2023.01)
*G01J 1/42* (2006.01)
(Continued)

(52) U.S. Cl.
CPC ............ *H04N 23/743* (2023.01); *G01J 1/42* (2013.01); *G02F 1/163* (2013.01); *G06T 3/60* (2013.01); *G06T 7/60* (2013.01); *G06T 7/70* (2017.01); *G06V 10/25* (2022.01); *G06V 10/60* (2022.01); *H04N 23/51* (2023.01); *H04N 23/71* (2023.01);
(Continued)

(58) Field of Classification Search
CPC ...... H04N 23/743; H04N 23/51; H04N 23/71; H04N 23/741; G01J 1/42; G01J 2001/4266; G02F 1/163; G06T 3/60; G06T 7/60; G06T 7/70; G06V 10/25; G06V 10/60
See application file for complete search history.

(56) References Cited

U.S. PATENT DOCUMENTS

| | | | |
|---|---|---|---|
| 4,779,980 A | * | 10/1988 | Hulstrom ............ G01J 1/42 356/218 |
| 10,514,671 B2 | | 12/2019 | Ashdown |

(Continued)

OTHER PUBLICATIONS

Operating Manual AllSky-340 and AllSky-340C CCD Cameras, Operating Manual for Allsky-340, AllSky-340C CCD Cameras. Revision 1.3 Jul. 29, 2010 Copyright © 2010 Santa Barbara Instrument Group, Inc. https://diffractionlimited.com/downloads/allsky/1_allsky340_manual.pdf.

C. Humann et al., Using HDR Sky Luminance Maps to Improve Accuracy of Virtual Work Plane Illuminance Sensors, Proceedings of the 15th IBPSA Conference San Francisco, CA, USA, Aug. 7-9, 2017.
(Continued)

*Primary Examiner* — Seung C Sohn
(74) *Attorney, Agent, or Firm* — Lowenstein Sandler

(57) ABSTRACT

A sky sensor device for measuring direct normal illuminance (DNE) value is described. One method controls a camera sensor to capture a series of exposure-bracketed images having a first dynamic range and generate an image from the series of exposure-bracketed images, the image having a second dynamic range higher than the first dynamic range. The method controls an illuminance sensor to measure a global illuminance value. The method determines a global horizontal diffuse value based on at least the image. The method determines a direct normal illuminance (DNE) value using the global illuminance value and the global horizontal diffuse value.

20 Claims, 20 Drawing Sheets

Related U.S. Application Data

(60) Provisional application No. 63/164,037, filed on Mar. 22, 2021, provisional application No. 63/148,512, filed on Feb. 11, 2021.

(51) Int. Cl.
  *G02F 1/163* (2006.01)
  *G06T 3/60* (2024.01)
  *G06T 7/60* (2017.01)
  *G06T 7/70* (2017.01)
  *G06V 10/25* (2022.01)
  *G06V 10/60* (2022.01)
  *H04N 23/51* (2023.01)
  *H04N 23/71* (2023.01)
  *H04N 23/741* (2023.01)

(52) U.S. Cl.
  CPC .... *H04N 23/741* (2023.01); *G01J 2001/4266* (2013.01)

(56) References Cited

U.S. PATENT DOCUMENTS 10,663,620 B2 * 5/2020 Bing ............... H02S 50/00
10,921,675 B2   2/2021 Barnum

OTHER PUBLICATIONS

Alphea "All Sky" Camera, Installation and user manual, Mar. 3, 2020 revision, http://www.alcor-system.com/new/AllSky/Alphea_camera.html.
http://www.bloomsky.com/ retrieved Feb. 10, 2022.
Oculus Handbook Issue 2, Oct. 2020, https://www.sxccd.com/product/oculus-all-sky-camera-150/.
Moonglow Technologies, http://www.moonglowtech.com/products/AllSkyCam/index.shtml, retrieved Feb. 10, 2022.
https://www.sieltec.com.es/ retrieved Feb. 10, 2022.
https://www.arducam.com/docs/lens/introduction/ retrieved Feb. 10, 2022.
https://picamera.readthedocs.io/en/latest/fov.html#theory-of-operation, retrieved Feb. 10, 2022.

* cited by examiner

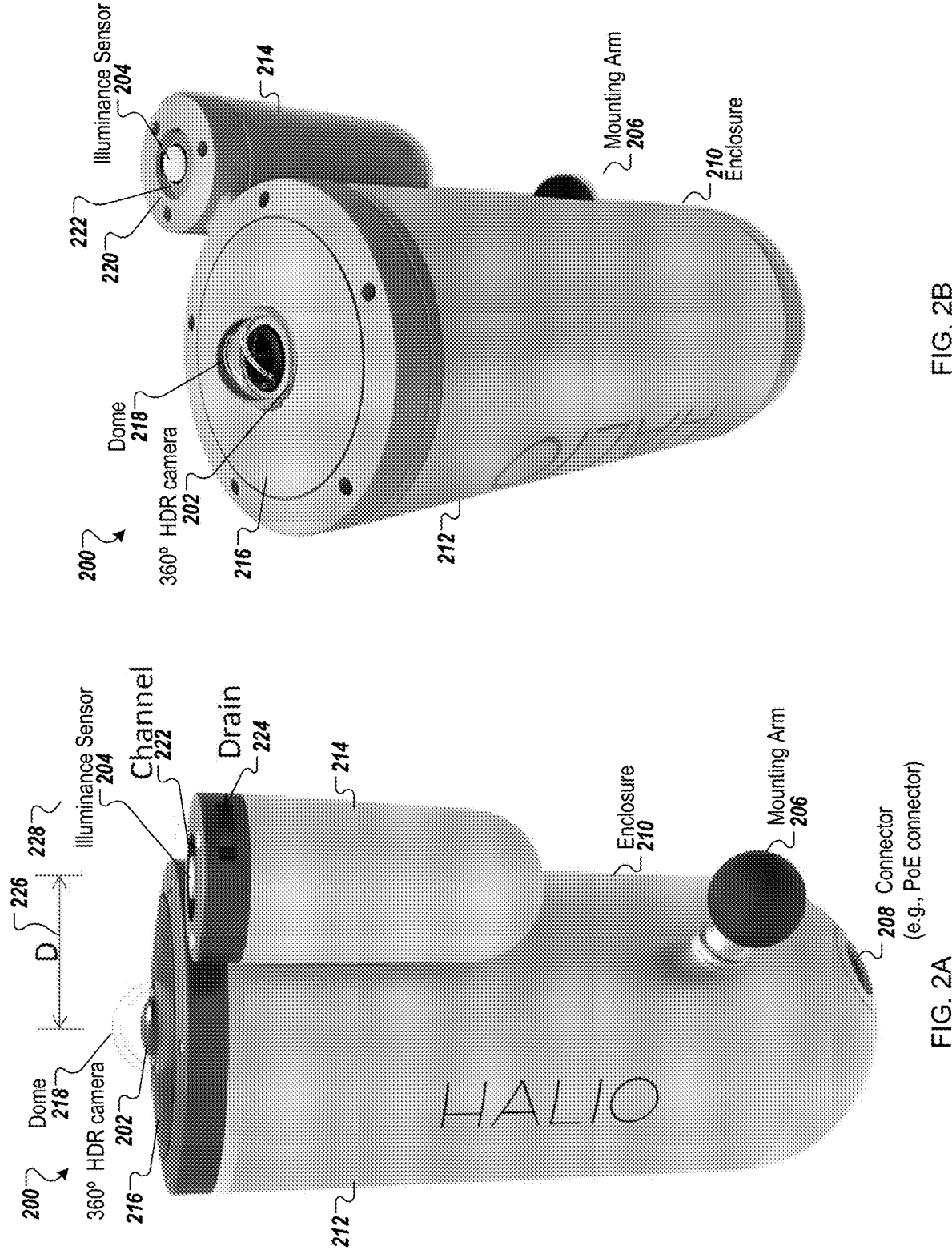

SKY SENSOR DEVICE

RELATED APPLICATIONS

This application is a divisional application of U.S. patent Ser. No. 17/650,655, filed Feb. 10, 2022, which claims the benefit of U.S. Provisional No. 63/164,037, filed Mar. 22, 2021, and U.S. Provisional No. 63/148,512, filed Feb. 11, 2021, the entire contents of which are incorporated by reference.

BACKGROUND

An electrochromic window system can use a building sensor, such as an irradiance sensor mounted on top of a roof of a structure. Traditionally, the irradiance sensor is a pyranometer. A pyranometer is a device that measures solar irradiance from a hemispherical field of view incident on a flat surface. Pyranometer-based systems are expensive and limited to measuring solar irradiance.

BRIEF DESCRIPTION OF DRAWINGS

The present disclosure will be understood more fully from the detailed description given below and from the accompanying drawings of various embodiments, which, however, should not be taken to limit the present disclosure to the specific embodiments but are for explanation and understanding only.

FIGS. 2A-2B are perspective views of a sky sensor device according to at least one embodiment.

DETAILED DESCRIPTION

Figure 1:
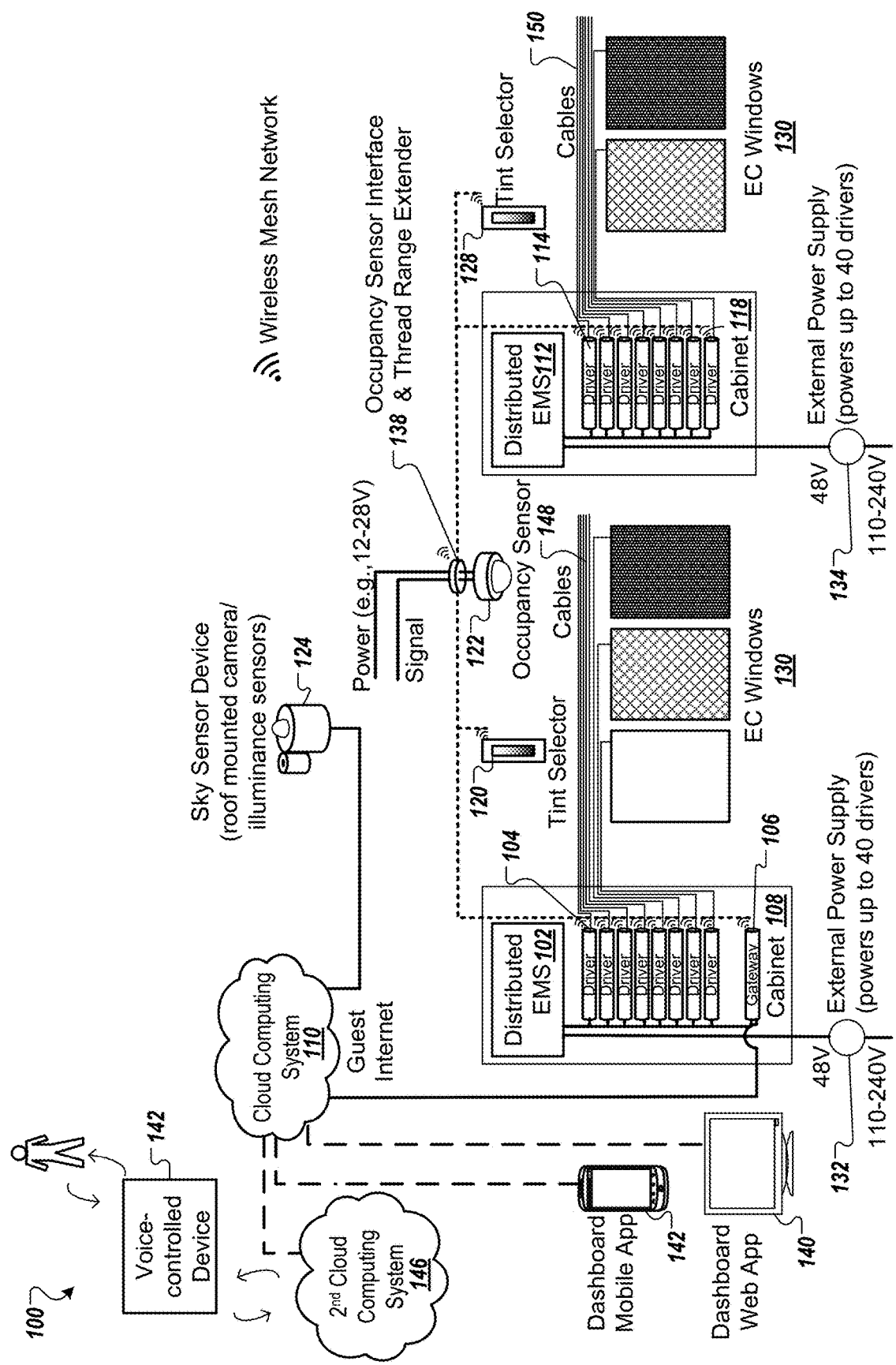
FIG. 1 is a block diagram of an electrochromic window system 100 with a sky sensor device to measure direct normal illuminance (DNE) according to at least one embodiment.

Technologies directed to sky sensor devices are disclosed herein. A sky sensor device is a product that can intelligently monitor the ever-changing conditions of the sun and sky and inform an electrochromic window system, such as a system using the Halio Smart-Tinting Glass developed by Kinestral Technologies, to optimize natural lighting of built environments. The sky sensor device captures high-resolution image sequences of the sky using a camera, measures an amount of illuminance with an illuminance sensor, and applies advanced data analytics to quantify and report sunlight and sky conditions and trends to a controller, such as a cloud computing system. The sky sensor device can be mounted on a roof of a building, and the sky sensor device can include a weatherproof enclosure and sensors housed in the weatherproof enclosure. The sensors may include a camera sensor and an illuminance sensor, such as an external light sensor. The sky sensor device can use high-resolution images and illuminance to determine the sky's direct normal illuminance (DNE). Direct normal irradiance (DNI) is an amount of solar irradiance measured over the entire spectrum, including infrared, visible, and ultraviolet (UV) spectrums, whereas DNE is an amount of illuminance in the visible spectrum. Since the sky sensor device is used in the context of controlling electrochromic window systems, visible light is of most interest for addressing glare from the sun on the windows.

The sky sensor device can operate day after day without the need for human intervention, withstanding wide-ranging weather conditions and seasons. The sky sensor device can work in conjunction with cloud-based software that continuously analyzes sequences of digital imagery data. It should be noted that the sky sensor device performs the image transformations and analysis. The information collected by the sky sensor device can feed into the system to determine optimal tinting responses and behavioral routines to maximize occupant comfort and energy savings.

The sky sensor device is an image-based sensing system that leverages illuminance to intelligently monitor the ever-changing conditions of the sun and sky to inform the electrochromic window system. The sky sensor device intelligently blends digital camera and data analytics in a manner that overcomes deficiencies of pyranometer-based sensor solutions. The sky sensor device is reliable, operating for years while being exposed to all weather conditions with only remote interaction. The sky sensor device is affordable compared to the more expensive pyranometer-based systems.

In at least one embodiment, the sky sensor device can monitor a full view of the sky when mounted on a rooftop. In at least one embodiment, the sky sensor device has minimal cabling, such as a single Ethernet cable that services both power and communications to a nearby network switch for Internet access. The sky sensor device can have a waterproof Ethernet connector at the bottom of the primary cylindrical housing. In at least one embodiment, the sky sensor device has a mounting ball that allows easy mounting to a standard pole mount. The mounting ball can help with the orientation of the sky sensor device in a desired position and orientation. In at least one embodiment, the sky sensor device includes a camera-based sensor.

Aspects of the present embodiments can provide various benefits. For example, the aspects of the present embodiments can provide full horizon image-based analysis of changing sky conditions, enable advanced, detailed analysis of sun conditions, cloud paths, etc., provide edge-device analytics speed responsiveness, lower data usage, replaces expensive pyranometer-based rooftop sensors, and advances automation capabilities. Aspects of the present embodiments can also withstand years of rooftop operation with minimal service, automatically alert operators/users when the digital camera view becomes compromised, streams localized sensor data for automation and device protection, simplifies installation, requiring only a single off-the-shelf cable, simplifies rooftop mounting while ensuring sensing accuracy, or the like.

FIG. 1 is a block diagram of an electrochromic window system 100 (e.g., smart window system) with a sky sensor device 124 to measure direct normal illuminance (DNE) according to one embodiment. The electrochromic window system 100 includes a first cabinet 108 in which a first distributed energy management system (EMS) 102, a first set of drivers 104, and a gateway 106 are located. In an alternate embodiment, the drivers 104 may be integrated drivers where one or more drivers are integrated into the EC windows. Each of the set of drivers 104 is coupled to an individual one of a set of electrochromic (EC) windows 130 (e.g., electrochromic devices). Alternatively, other electrochromic devices can be driven by drivers 104. The set of drivers 104 is coupled to EC windows 130 via power cables 148 and control wires.

The first cabinet 108 can be a standard size, such as 28", 42", or 60". The first cabinet 108 can be located near or in proximity to the EC windows 130 or located away from the EC windows 130, such as up to 300 feet. The first cabinet 108 can be located in a location that reduces wiring costs. Between each driver and EC window, there may be one or more power cables 148 coupled to an anode of the EC window and one or more power cables 148 coupled to a cathode of the EC window. There may be two control wires for sensing the voltage of the EC window (referred to herein as sense voltage or Vsense) and two wires for sequestration operations, as described herein. In one embodiment, each driver of the set of drivers 104 can supply up to 8 amps to each EC window of the set of EC windows 130. An external power supply 132 is coupled to provide external power to the distributed EMS 102, the set of drivers 104, and the gateway 106 within the first cabinet 108. For example, 16 AWG 2 conductor plenum cables can provide lower voltage (48V) or higher voltage (110-240V) to the first cabinet 108. The external power supply 132 can be located near or in proximity to the first cabinet 108 or farther away from the first cabinet 108, such as up to hundreds of feet or up to 1000 feet. In some embodiments, the external power supply 132 is configured to supply less than 25% of a maximum power used by the set of EC windows 130 during switching of one or more of the set of EC windows 130. Additional external power supplies can power the components in the first cabinet 108. The external power supply 132 may be a conventional power supply connected to the power grid, or it may be a building battery such as the residential batteries built by Tesla (the Powerwall battery) or LG Chem's RESU battery that obtain energy from a source such as on-site solar energy cells. The external power supply 132 may be a combination of the power grid and a building battery.

Although portions of the present disclosure describe the electrochromic window system 100 in relation to a distributed EMS, the electrochromic window system 100 may include one or more different types of power sources (e.g., a battery, a local power source inside of a driver, a multi-device boost power supply, etc.) in addition to or instead of the distributed EMS.

Each EC window may include an electrochromic panel (e.g., glass or film) that can change transmissivity with the application of electric current and voltage. The change of transmissivity typically relies on a reversible oxidation of a material. Electrochromic units can darken at the press of a button (e.g., user input via tint selector 120 or 128, dashboard web app 140, dashboard mobile app 142, etc.) or in response to an automatic triggering event and are also often used in automobile rearview mirrors to reduce reflective glare. In some embodiments, upon receiving user input via the tint selector 120 to tint a first EC window associated with a first driver, the tint selector 120 may transmit instructions to the first driver, and the first driver may control the tint level of the EC window. The different transmissivities of the EC windows may be referred to as tint levels (e.g., 0% tint level is 65% transmissivity, 50% tint level is 21% transmissivity, 100% tint level is 2% transmissivity, etc.). In some embodiments, upon receiving user input via a user device to tint a first EC window associated with a first driver, dashboard web app 140 or dashboard mobile app 142 (e.g., executing on the user device) may transmit the user input to the cloud computing system 110, the cloud computing system 110 may transmit the user input to the gateway 106, and the gateway 106 may transmit the user input to the first driver to cause the first driver to control the tint level of the first EC window.

In some embodiments, one or more power sources (e.g., the distributed EMS, a battery, a local power source inside of a driver, a multi-device boost power supply, etc.) may provide additional power (e.g., boost power) to an electrochromic device (e.g., EC window 130) that can be supplied by a main power supply. The one or more power sources may support a varied number of EC windows based on the geometry and size of the EC windows, how often the EC windows are tinted, as well as how low other power sources (e.g., the batteries of the distributed EMS 102) can be discharged.

Each power source (e.g., distributed EMS 102) may supply power to the set of drivers 104 according to a power state of the set of EC window 130 and the power state of other power sources. For example, the distributed EMS 102 can supply a first amount of power to the set of drivers 104 from an external power supply interface in an idle state of the set of EC windows 130. Alternatively, the distributed EMS 102 does not supply power to the set of EC windows 130 in the idle state. In some embodiments, the idle power level of an EC window may be zero, for example, when the type of EC device used only requires power to switch from one optical transmission state to another optical transmission state. The power state information (e.g., idle state, tinted state, transitioning between states, etc.) may be provided to the gateway 106 and shared with the cloud computing system 110.

The additional power provided by one or more power sources can enable fast and uniform switching in a variety of conditions, and in particular when the EC window 130 includes a gradient conductive layer.

An EC window 130 including a gradient transparent conductive layer can have a very fast switching speed (e.g., less than 5 minutes, or less than 10 minutes) as well as uniform transitions between states (e.g., where the clear state, dark state, and all tinted states have delta E across the area of the panel less than 10) by including one or more gradient transparent conductive layers in each EC device or panel. The term "gradient transparent conductive layer" refers to an electrically conducting layer with spatially varying sheet resistance or resistance to current flow substantially parallel to a major surface of the layer that varies as a function of position within the electrically conductive layer. The gradient transparent conductive layer or layers also enable the driving of an EC window 130, incorporating such a layer at much higher voltages so that high amounts of power are required initially to drive fast switching. The gradient transparent conductive layer may be a patterned or graded transparent conductive oxide (TCO) such as indium titanium oxide and tantalum tin oxide. In other embodiments, the distributed EMS 102 can be used in connection with drivers that drive other types of electrochromic devices. Additionally, the distributed EMS can be used to drive multi-panel electrochromic windows that include more than one EC window 130 connected in series or parallel. A multi-panel electrochromic window may be one where the EC windows 130 are stacked over one another to provide very low transmissivity of light through the devices, for example, less than 1% transmissivity of light or less than 0.1% transmissivity of light. Alternatively, the multi-panel electrochromic windows may be "tiled" adjacent to one another such that more than one EC window 130 is laminated to a carrier glass substrate to form larger-sized windows. In another embodiment, a single driver may be used to drive multiple electrochromic windows that may be in a group of electrochromic windows. For example, a single driver may drive two or more electrochromic windows.

The gateway 106 is operatively coupled to a cloud computing system 110. A cloud computing system refers to a collection of physical machines (e.g., server devices) on which host applications provide one or more services to multiple components (e.g., gateway 106, sky sensor device 124, sensor hub 126, drivers 104, distributed EMS 102, user devices executing dashboard mobile app 142 or dashboard web app 140, etc.) via a network. In some implementations, the applications hosted by cloud computing system 110 may provide services (e.g., scheduling, viewing, remote management, automated control, etc.) to users accessing the cloud computing system 110 via a network. The applications may allow users to manipulate (e.g., access, create, edit, store, delete, share, collaborate, print, etc.) electronic documents (e.g., schedules, rules, configurations, automated control, etc.). The cloud computing system 110 may include one or more server devices and one or more data stores. The gateway 106 can be hardwired (e.g., via Ethernet) to a network device of a guest Internet, such as a network device in a local area network, to gain access to a private or public network to access the cloud computing system 110. The gateway 106 can communicate with the cloud computing system 110 over Cat 5 wiring using the TCP/IP protocol with TLS (SSL) for secure communications. The gateway 106 can communicate with the cloud computing system 110 using communications, such as using IPV4, IPv6, or Transport Layer Security (TLS) networking protocols. The cloud computing system 110 can provide control logic, automated control (e.g., cause tint level of the EC windows 130 to be set to avoid glare), and configuration for the electrochromic window system 100. The cloud computing system 110 may receive information (e.g., via one or more application programming interfaces (APIs), weather information, etc.) for providing automated control, etc. The cloud computing system 110 may determine which of EC windows 130, each device (e.g., tint selector 120 or 128, gateway 106, etc.), and each application (e.g., dashboard mobile app 142, dashboard web app 140, etc.) is authorized to view and/or control and the priority of control. For example, the cloud computing system 110 may determine that the tint selector 120 is authorized to control EC windows 130 connected to drivers 104. In another example, the cloud computing system 110 may determine that the dashboard mobile app 142 logged in by a first user is authorized to view and control only the first window of the EC windows 130. During configuration (e.g., commissioning, set-up by an administrator), the cloud computing system 110 may receive instructions of which users and which devices are authorized to control specific EC windows 130. In some embodiments, the cloud computing system 110 may authorize access by components (e.g., tint selectors 120 and 128, gateway 106, etc.) to a wireless mesh network (e.g., during commissioning or set-up), and once authorized, subsequent access of the wireless mesh network is not dependent on further authorization (e.g., components are authorized during commissioning or set-up and do not need further authorization to continue accessing).

In some embodiments, the cloud computing system 110 may use machine learning to provide control of the EC windows 130. In some embodiments, the cloud computing system 110 may include a broker module to receive data from the gateway 106, sensor hub 126, etc. (e.g., providing quality control, providing automated control, providing data visibility) and transmitting data to other gateways 106. In some embodiments, control of the EC windows 130 may be distributed over the cloud computing system 110 and the gateway 106. For example, the cloud computing system 110 may provide settings files (e.g., a schedule, rules, etc.) to the gateway 106, and the gateway 106 may control the EC windows 130 based on the settings files. The cloud computing system 110 may send additional instructions to the gateway 106 to deviate from the settings files in controlling the EC windows 130 (e.g., responsive to the cloud computing system 110 receiving user input via a dashboard mobile app 142, sensor data via the sensor hub 126, the gateway 106 may provide a conduit for control of the EC windows 130, etc.).

The cloud computing system 110 can provide automation algorithms, data analytics, user management, security protocols, and the like. The cloud computing system 110 can provide extensive system health monitoring, proactive troubleshooting, and third-party integration without complicated on-site technical support. The cloud computing system 110 can provide a system dashboard to a dashboard web app 140 on a desktop computer, a dashboard mobile app 142 on a personal computing device, or both. The dashboard web app 140 and the dashboard mobile app 142 can be used to monitor or control the electrochromic window system 100. The dashboard web app 140 and the dashboard mobile app 142 are applications that may be executed on one or more user devices. For example, the dashboard mobile app 142 may execute on a mobile user device, such as a smartphone or a tablet. The dashboard web app 140 may execute on a desktop, laptop, etc. The dashboard web app 140 or the dashboard mobile app 142 (executing on a user device) may receive user input (e.g., selection of one or more EC windows and a tint level) via the user device and transmit the user input to the cloud computing system 110. Responsive to determining that the user input is a request to view information (e.g., monitor the current status of components, the current mode of EC windows 130, etc.), the cloud computing system 110 may retrieve the information and transmit the information to the user device to cause the dashboard web app 140 or dashboard mobile app 142 to display the requested information. Responsive to determining that the user input is a request to change the operation of one or more components of the electrochromic window system 100, such as a request to tint a first EC window associated with a first driver, the cloud computing system 110 may transmit the user input to the gateway 106, the gateway 106 may transmit the user input to the first driver, and the first driver may control the tint level of the first EC window based on the user input.

The cloud computing system 110 can also interact with other devices or networks, such as a second cloud computing system 146, as illustrated in FIG. 1, that communicates with a voice-controlled device 144. For example, the voice-controlled device 144 may receive audible commands from a user to control or get a report of the electrochromic window system 100. The dashboard web app 140 and the dashboard mobile app 142 can communicate with the cloud computing system 110 using the TCP/IP protocol with TLS (SSL) and encryption and authentication for secure communications. The cloud computing system 110 can include a microservice architecture (e.g., application architecture) exposed through application programming interfaces (APIs) to manage interaction with on-site components, such as the gateways, drivers, and tint selectors. The cloud computing system 110 can eliminate complicated on-site networking requirements, as external control occurs through the APIs. The cloud computing system 110 can provide centralized data aggregation from all deployments to facilitate automation and analytics. The cloud computing system 110 can leverage various authentication and authorization technologies to secure site access. The cloud computing system provides a robust platform that facilitates on-demand load scaling and health monitoring. The cloud computing system 110 can also provide a better path for on-site workload migration, backed by a robust central cloud store.

As described above, gateway 106 communicates directly with the cloud computing system 110 through a secured channel(s). The gateway 106 communicates with the cloud computing system 110 on behalf of the set of drivers 104 and the distributed EMS 102. The gateway 106, the set of drivers 104, and the distributed EMS 102 communicate with each other over wireless connections, such as over a secure thread wireless network. For example, these components can communicate using IEEE 802.15.4, 2.4 GHz, IPv6 mesh network routing (thread). These communications can be encrypted with 128-bit AES encryption. Alternatively, other mesh networks and other frequencies and encryption techniques can be used.

It should be noted that, after the drivers and the distributed EMS are configured via the gateway, the distributed EMS and driver behavior is not dependent on the gateway for safe operation. That is, the gateway can be disconnected, and the drivers will not drain the batteries of the distributed EMS.

As illustrated in FIG. 1, the electrochromic window system 100 may include additional devices, such as a tint selector 120, an occupancy sensor 122, an occupancy sensor interface and thread range extender 138, a sky sensor device 124 (e.g., roof-mounted camera/illuminance sensors) as described herein. The sky sensor device 124 can be powered over Ethernet that can be hardwired to the Internet, such as via a network switch in the building. Alternatively, the sky sensor device 124 can be powered by an external power supply or other power sources. The sky sensor device 124 can be a computer system connected (e.g., networked) to other machines in a LAN, an intranet, an extranet, or the Internet. The sky sensor device 124 can include a computer system for performing the operations described herein. In one embodiment, the computer system may include instructions to execute the processes and corresponding components shown and described herein. The computer system may operate in the capacity of a client machine in a client-server network environment. The computer system may be any machine capable of executing a set of instructions (sequential or otherwise) that specify actions to be taken by that machine. The term "machine" shall also be taken to include any collection of machines that individually or jointly execute a set (or multiple sets) of instructions to perform any one or more of the methodologies discussed herein.

The occupancy sensor interface and thread range extender 138 and occupancy sensor 122 can be powered by an external power supply and send or receive signals to or from a lighting system or a building management system (BMS). The tint selector 120, occupancy sensor interface, and thread range extender 138 can communicate with other devices on the wireless mesh network. The tint selector 120 can be a device mounted on a wall where a user can activate a transition of the EC window 130. The tint selector 120 can be mounted or otherwise disposed in a building having the EC windows 130 to permit user control of the set of EC windows. The tint selector 120 can be programmed to be part of a group of EC windows (e.g., a set of windows that are to be set at the same tint level, e.g., all EC windows in the group tinted 50%). That is, the tint selector 120 can be associated with the set of drivers 104 and the gateway 106. Alternatively, the tint selector 120 can be associated with a scene of one or more EC windows, or the like. Upon receiving user input (e.g., via the tint selector 120) for EC windows to be tinted in a scene, one or more first EC windows of the scene are to be tinted at a first tint level and one or more second EC windows of the scene are to be tinted at a second tint level (e.g., all EC windows of the scene are to be tinted 100% except for one EC window of the scene that is to be tinted 50%). Upon receiving user input, the tint selector may transmit (e.g., multicast) a signal to the corresponding drivers to cause the EC windows to change the tint level. The tint selector may also transmit the user input to the gateway 106 to cause the gateway to transmit the user input to the cloud computing system 110.

The electrochromic window system 100 can have one or more additional tint selectors, such as illustrated in FIG. 1 by a second tint selector 128 that is also wirelessly coupled to the wireless mesh network. The second tint selector 128 can be associated with the same group or scene as the tint selector 120. Alternatively, the second tint selector 128 can be associated with a different group or a different scene than the tint selector 120.

In a further embodiment, the electrochromic window system 100 can include one or more cabinets, such as illustrated in FIG. 1 with a second cabinet 118. The second cabinet 118 can include a second distributed EMS 112 and a second set of drivers 114. In some cases, the second cabinet 118 does not include a second gateway, and the gateway 106 manages the second set of drivers 114. An external power supply 134 is coupled to provide external power to the second distributed EMS 112 and the second set of drivers 114 within the second cabinet 118. For example, 16 AWG 2 conductor plenum cables can provide lower voltage (48V) or higher voltage (110-240V) to the second cabinet 118. The external power supply 134 can be located near or in proximity to the second cabinet 118 or farther away from the second cabinet 118, such as up to 350 feet. In other cases, more than two cabinets may be used. It should also be noted that additional external power supplies can be used to power the components in the first cabinet 108 and the second cabinet 118.

Each component of the electrochromic window system 100 can be designed to automatically obtain critical operating data from the cloud computing system 110 to avoid a single failure requiring significant maintenance downtime. Although various components are illustrated in FIG. 1, in other embodiments, the electrochromic window system 100 may include more or fewer components than as illustrated in FIG. 1. In another embodiment, a driver for an electrochromic window may be integrated into the EC window itself in either the frame of the window or in the integrated glass unit (IGU) or laminated glass unit (LGU) of the EC window.

In another embodiment, the electrochromic window system 100 includes drivers 160 located at each of the set of EC windows 130, instead of or in addition to the set of drivers 104 in the first cabinet 108. In some cases, each EC window 130 has a driver 160, as illustrated. In other cases, a single driver 160 can drive multiple EC windows 130. The drivers 160 can be coupled to an external power supply. The external power supply can be located at the EC window 130 or in close proximity. In this case, the external power supplies for the set of EC windows 130 can be considered to be distributed instead of centralized, as described above. In other cases, the drivers 160 do not use an external power supply.

It should be noted that various embodiments described herein are described with respect to a commercial installation. In other embodiments, the electrochromic window system 100 can be deployed in a residential installation. In those cases, there may be modifications to the electrochromic window system 100 as described above to accommodate differences between the commercial installation and the residential installation.

An example computer system includes one or more processing devices (processor, multi-core processor, or multiple processors), a main memory (e.g., read-only memory (ROM), flash memory, dynamic random access memory (DRAM) such as synchronous DRAM (SDRAM)), a static memory (e.g., flash memory, static random access memory (SRAM)), and a data storage device, which communicate with each other via a bus.

The processing device can be a microprocessor, a central processing unit (CPU), or the like. More particularly, the processing device may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also be one or more special-purpose processing devices, such as an application-specific integrated circuit (ASIC), a field-programmable gate array (FPGA), a digital signal processor (DSP), a network processor, or the like. In various implementations of the present disclosure, the processing device is configured to execute instructions for performing the operations and processes described herein.

The computer system may further include a network interface device. The computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

The data storage device may include a computer-readable storage medium (or machine-readable medium) on which is stored one or more sets of instructions of any one or more of the methodologies or functions described herein. The instructions may also reside, completely or at least partially, within the main memory and/or within processing logic of the processing device during execution thereof by the computer system, the main memory, and the processing device also constituting computer-readable media.

The instructions may further be transmitted or received over a network via the network interface device. While the computer-readable storage medium is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Additional details of the sky sensor device 124 are described below with respect to FIGS. 2A-2H and 3A-3D.

FIGS. 2A-2B are perspective views of a sky sensor device 200 according to at least one embodiment. The sky sensor device 200 is similar to the sky sensor device 124 of FIG. 1. The sky sensor device 200 includes a camera sensor 202 and an illuminance sensor 204. The camera sensor 202 can be a 360-degree HDR camera sensor. The sky sensor device 200 includes a mounting arm 206 and a connector 208 on an enclosure 210. The mounting arm 206 allows the enclosure 210 to be mounted. The connector 208 provides power and data connections to the sky sensor device 200. The connector 208 can be a Power over Ethernet (PoE) connector to combine both data and power into a single connector. The enclosure 210 can be waterproof.

The sky sensor device 200 includes a primary cylindrical housing 212 that houses the camera sensor 202 and a secondary cylindrical housing 214 (also referred to as a "sidecar") that houses the illuminance sensor 204. The primary cylindrical housing 212 has a top surface 216. In at least one embodiment, the camera sensor 202 is located in the center of the top surface 216. The camera sensor 202 can be covered by a dome 218 (e.g., a transparent dome). In at least one embodiment, the dome 218 can be a glass dome. The dome 218 can include a Gorman port to prevent condensation of water vapor on the camera sensor. The secondary cylindrical housing 214 has a top surface 220. In at least one embodiment, the illuminance sensor 204 is located in the center of the top surface 220. The illuminance sensor 204 can be located in a recessed region so that a top of the illuminance sensor 204 is located on a same plane as the top surface 220. In at least one embodiment, as illustrated in FIGS. 2A-2B, the illuminance sensor 204 can be positioned within a channel 222 (e.g., a recessed channel is disposed around the illuminance sensor 204). The channel 222 can operate to obstruct the illuminance sensor 204 from the light below and provide a route for water to flow out a drain 224 on the side of the secondary cylindrical housing 214. The channel 222 can create the hemisphere of the illuminance sensor 204 to be at 180 degrees, instead of 190 degrees, for example.

In at least one embodiment, as illustrated in FIG. 2A, the illuminance sensor 204 can be located at a specified distance 226, D, from the camera sensor 202. The specified distance 226 needs to be small enough to capture light data from the same approximate location but large enough that the illuminance sensor 204 (or the secondary cylindrical housing 214) does not interfere with the camera sensor 202 and the camera sensor 202 does not interfere with the illuminance sensor 204. In at least one embodiment, the distance 226 between the camera sensor 202 and the illuminance sensor 204 is equal to or greater than a sum of a radius of the first cylindrical housing 212 and a radius of the second cylindrical housing 214. In at least one embodiment, the illuminance sensor 204 is located at a specified angle below a top of the dome 218 (e.g., the camera's protective glass dome) that limits the amount of obstruction by the dome 218, such as approximately five degrees of obstruction. That is, the illuminance sensor 204 is located at a location such that the dome 218 causes between zero degrees and ten degrees of obstruction to the illuminance sensor 204. The illuminance sensor 204 can obtain an almost full global reading of a hemisphere, less approximately a few degrees of obstruction caused by a component of the camera sensor 202 (e.g., dome 218). In another embodiment, the illuminance sensor 204 is located at a specified distance from the camera sensor 204 such that the dome 218 causes between zero and ten degrees of obstruction to the illuminance sensor 204. In another embodiment, the illuminance sensor 204 is located at a location offset from the camera sensor 204 such that the dome 218 causes between zero and ten degrees of obstruction to the illuminance sensor 204. In another embodiment, the top surface 216 of the primary cylindrical housing 212 and the top surface 220 of the secondary cylindrical housing 214 can be on the same plane, but the illuminance sensor 204 can be located slightly below the camera sensor 202 so that the dome 218 does not obstruct the illuminance sensor 204 and the illuminance sensor 204 does not obstruct the camera sensor 202. In another embodiment, the illuminance and camera sensors 204, 202, are located on the same plane, as illustrated in FIG. 2D. In at least one embodiment, the primary and secondary cylindrical housings 212, 214, are separate enclosures. In another embodiment, the primary and secondary cylindrical housings 212, 214 are made as an integrated enclosure. In at least one embodiment, a top cap of primary cylindrical housing 212 (or 214) can be metal, such as aluminum, so that a heater can heat it. In at least one embodiment, the top surfaces can be slightly curved so that snow and water can drain off the top surface, especially when the heater heats the snow. The enclosures can be metal or plastic but need to be sturdy and withstand weather conditions on a roof of a building, such as wind. In at least one embodiment, the sky sensor device 200 can have an industrial design that is patterned based on a telescope (e.g., substantially cylindrical), but any industrial design can be used for functional or aesthetic purposes. In another embodiment, the camera and illuminance sensors 202, 204 can be integrated into a housing while maintaining the appropriate positioning between the two sensors.

The camera sensor 202 can have a full sky field of view (180×360 degrees). The camera sensor 202 can capture digital images with a high-performance lens, such as a fisheye-type lens. In at least one embodiment, the camera sensor 202 is considered a 360-degree HDR camera. The camera sensor 202 can include a camera module capable of capturing a series of exposure bracketed, LDR images with manual control of Exposure, White Balance, and ISO. Software, executing on a processing device of the sky sensor device 200, can combine the resultant LDR images to create an HDR image. Dynamic range refers to a ratio between an image's brightest and darkest parts. The processing device can be a multi-core processor with advanced image processing. The processing device can communicate with cloud-based automation services, such as the Halio cloud-based system. The processing device can determine a sky condition from the images and measurements from the illuminance sensor 204. The sky condition has two components relative to the sky sensor device 200: a diffuse sky component and a direct sky component. Using only the camera sensor 202, the sky sensor device 200 can determine the diffuse sky component but cannot determine DNE since the camera sensor 202 cannot measure the full brightness of the sun as the sun saturates the camera sensor 202. So, to determine DNE, the sky sensor device 200 uses the camera sensor 202 to measure the diffuse sky component and the illuminance sensor 204 to measure a global illuminance value. In at least one embodiment, the sky sensor device 200 can determine a global direct horizontal illuminance (also referred to as direct horizontal illuminance) by subtracting the diffuse sky component from the global illuminance value. The sky sensor device 200 can convert the global direct horizontal illuminance into the DNE using the sun's altitude. The direct horizontal illuminance can be captured concurrently with the diffuse value (diffuse sky component) from image processing of the HDR images. So, as the camera sensor 202 captures LDR images, the global illuminance value is measured by the illuminance sensor 204. In at least one embodiment, multiple global illuminance values are measured and averaged over the span that the LDR images are captured. Additional details regarding the generation of HDR images from LDR images are described in U.S. application Ser. No. 13/798,050, filed on Mar. 12, 2013, now U.S. Pat. No. 9,406,028, the entire contents of which are incorporated by reference, and also described in U.S. application Ser. No. 15/225,047, filed on Aug. 1, 2016, now U.S. Pat. No. 10,579,024, the entire contents of which are incorporated by reference.

In at least one embodiment, the DNE value is an amount of illuminance in the visible spectrum (also referred to as visible light) and is indicative of a sky condition (or a sunlight condition) in a field of view of the sky sensor device 200. The sky condition relates to glare from the sun on a window of a structure near the sky sensor device 200. The sky sensor device 200 can report the sky condition to an electrochromic window system to control a tint level of one or more electrochromic windows based on the sky condition.

In at least one embodiment, the sky sensor device 200 includes a processing device with a first interface coupled to the camera sensor 202 and a second interface coupled to the illuminance sensor 204. The processing device also includes a processor core (or multiple cores) coupled to the first and second interfaces. The processor core can control the camera sensor 202 to capture a series of exposure-bracketed images having a first resolution and generate an image from the series of exposure-bracketed images. The image has a second resolution higher than the first resolution. In at least one embodiment, the processor core can control the camera sensor 202 to capture a series of exposure-bracketed images having a first dynamic range and generate an image from the series of exposure-bracketed images having a second dynamic range that is higher than the first dynamic range. The processor core controls the illuminance sensor 204 to measure a global illuminance value. The processor core determines a global horizontal diffuse value based on at least the image. The processor core determines a DNE value using the global illuminance and horizontal diffuse values. The processor core sends the DNE value to an electrochromic window system for controlling a tint level of one or more electrochromic windows of the electrochromic window system.

In a further embodiment, the processor core determines a first location of the sky zenith in the image. The processor core determines a second location in the image, representing an expected location of the sun using solar altitude and azimuth values. The processor core creates an ROI mask in the image at a predetermined radius from the second location. The processor core determines a centroid location of pixels within the ROI mask having brighter pixel values than other pixels in the ROI mask. The processor core determines an angle between the second and the centroid locations relative to the sky's zenith. The processor core rotates the image by the angle to obtain a rotated image.

In a further embodiment, the processor core determines that the angle satisfies a threshold condition representing a misaligned camera sensor. The processor core sends a notification to a user of the misaligned camera sensor responsive to the angle satisfying the threshold condition. The notification can be a text message, an email, an on-screen notification, or the like.

Figure 2C:
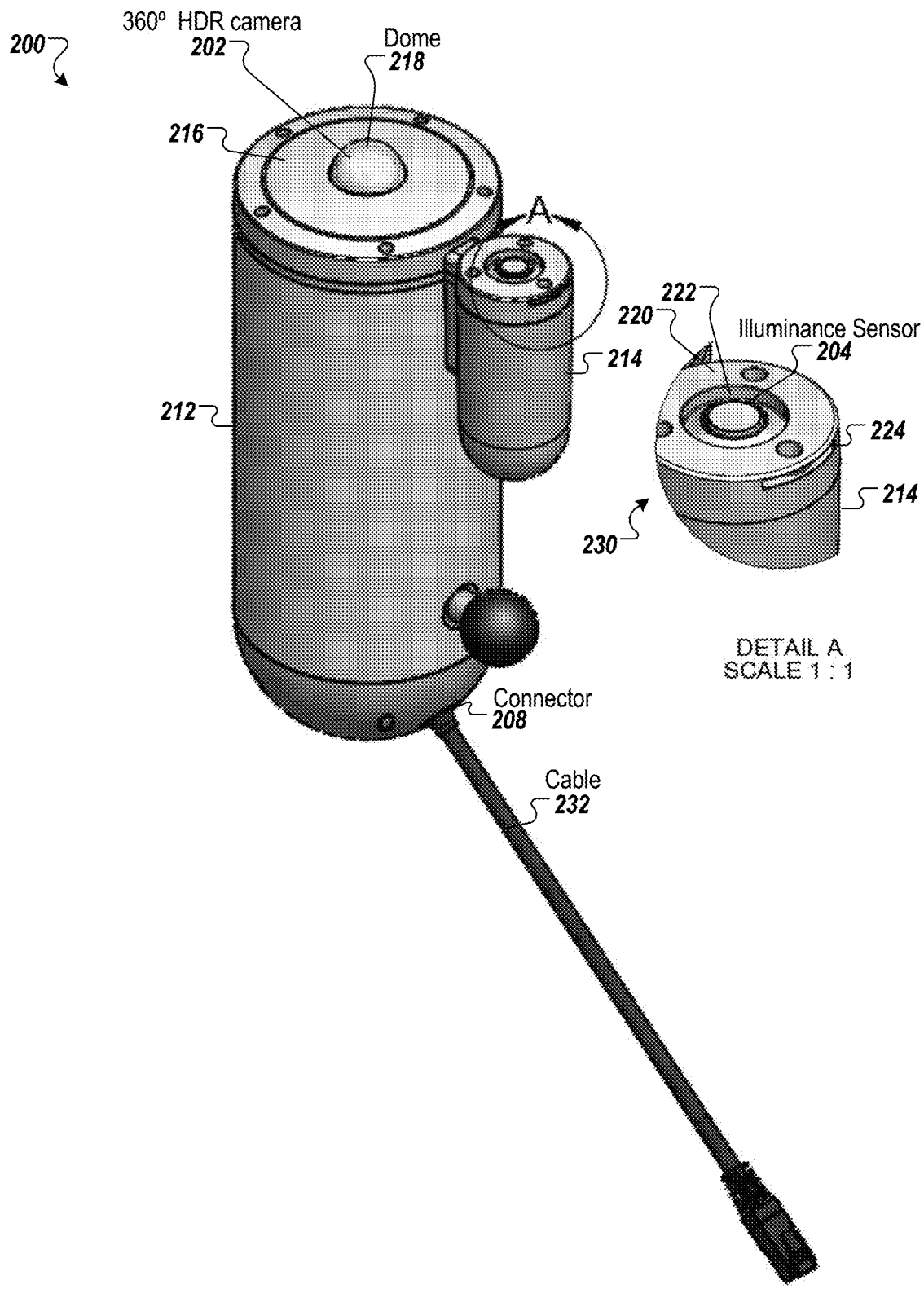
FIG. 2C is a perspective view with a zoomed-in view of an illuminance sensor of a sky sensor device according to at least one embodiment.
Figure 2D:
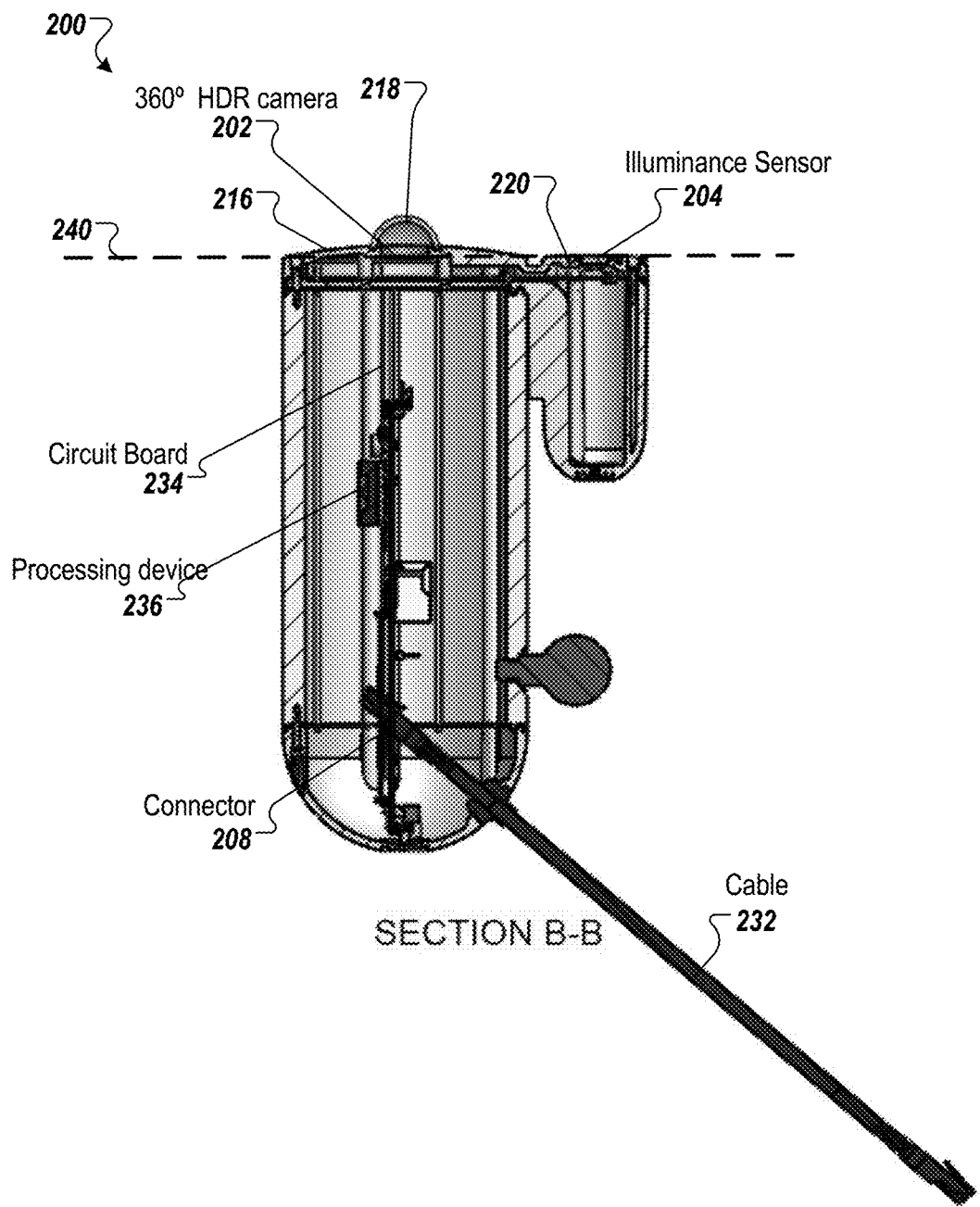
FIG. 2D is a cross-section side view of a sky sensor device according to at least one embodiment.

As described above, the illuminance sensor 204 can be located in a center of a top surface 216 and positioned within a channel 222, as illustrated in further detail in FIG. 2C.

FIG. 2C is a perspective view with a zoomed-in view 230 of an illuminance sensor 204 of a sky sensor device 200 according to at least one embodiment. The channel 222 can be a recessed channel that is disposed around the illuminance sensor 204. The channel 222 can restrict the effective region of illuminance measurement to a hemisphere above the illuminance sensor 204, obstructing the illuminance from the light below the illuminance sensor 204. The channel 222 can also provide a route for water to flow out a drain 224 on a side of the secondary cylindrical housing 214.

As illustrated in FIG. 2C, a cable 232 is connected to the connector 208. The cable 232 can be an Ethernet cable coupled to a PoE connector. In at least one embodiment, as illustrated in FIG. 2D, which shows a cross-sectional view of the sky sensor device 200, the cable 232 can extend through an opening in the first enclosure with a waterproof seal, where one end of the cable 232 is connected to the connector 208 that is located on a circuit board or otherwise within the primary cylindrical housing 212 and a second end of the cable 232 can be plugged into a connector, such as an outlet in or on a building, or another device, such as a network switch, a network router, or the like. As illustrated in FIG. 2D, the illuminance sensor 204 and the camera sensor 202 are located on a same plane 240. In other embodiments, the illuminance sensor 204 and the camera sensor 202 are located on different planes. In another embodiment, the connector 208 can receive a data cable and a power cable.

As illustrated in FIG. 2D, a circuit board 234 is located within the primary cylindrical housing 212. The circuit board 234 can include a processing device 236. The circuit board 234 can include one or more processors or other integrated circuits that can control the camera sensor 202 and the illuminance sensor 204 and process the data from these sensors. The circuit board 234 can also include an integrated circuit for the camera sensor 202 that is separate from a processing device used to process images captured by the camera sensor 202.

Figure 2E:
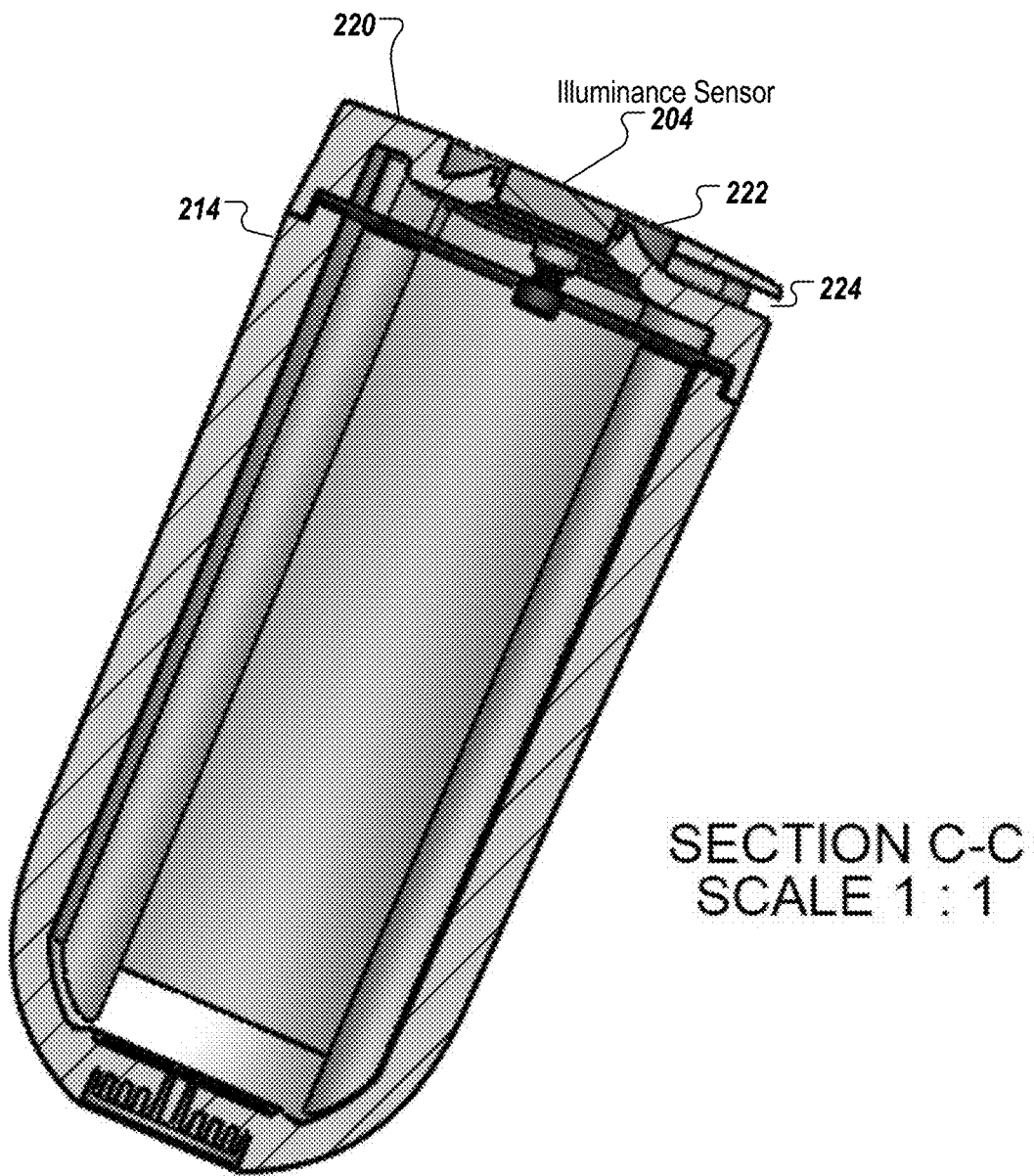
FIG. 2E is a cross-section perspective view of a sky sensor device with a camera sensor and an illuminance sensor according to at least one embodiment.

FIG. 2E is a cross-section perspective view of a sky sensor device 200 according to at least one embodiment. The perspective view shows that channel 222 is located around the illuminance sensor 204. The channel 222 can provide a route for water to flow out the drain 224 on the side of the secondary cylindrical housing 214.

Figure 2F:
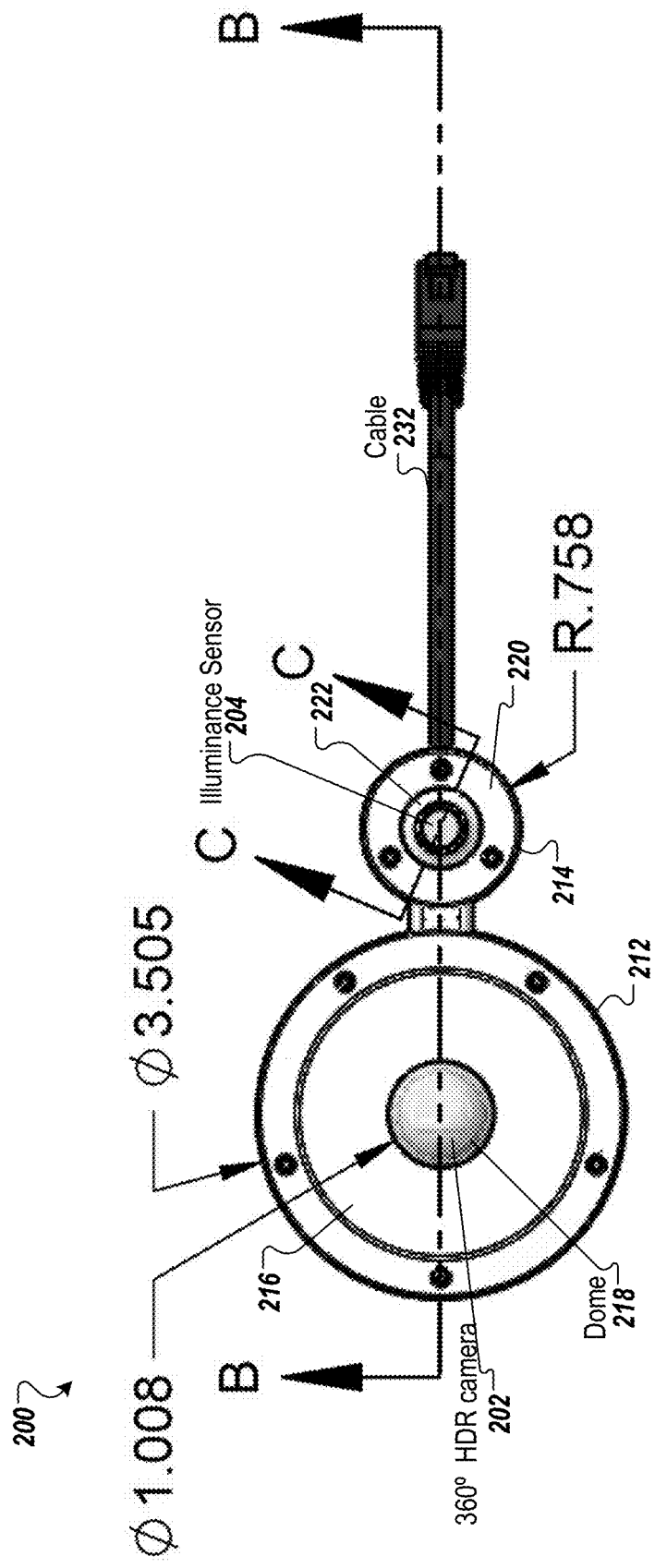
FIG. 2F is a top view of a sky sensor device according to at least one embodiment.

FIG. 2F is a top view of a sky sensor device with a camera sensor 202 and an illuminance sensor 204 according to at least one embodiment. The sky sensor device 200 includes a transparent dome 218 (e.g., a glass dome) on the top surface 216 of the primary cylindrical housing 212 (a first enclosure) under which is a camera sensor 202. Adjacent to the primary cylindrical housing 212 is a secondary cylindrical housing 214 that houses the illuminance sensor 204. The illuminance sensor 204 is located on the top surface 220 of the second cylindrical housing 214 (a second enclosure) adjacent to the primary cylindrical housing 212. The primary cylindrical housing 212 includes a first diameter (e.g., 3.505 inches), and the secondary cylindrical housing 214 has a second diameter (e.g., 1.516 inches (radius is 0.758). The transparent dome 218 can include a specified diameter (e.g., 1.008 inches, 25 mm, or 0.984 inches). The transparent dome 218 can be located in a center of the primary cylindrical housing 212. The camera sensor 202 is located under the transparent dome 218, and the transparent dome 218 protects the camera sensor 202. The top surface 216 of the primary cylindrical housing 212 can be slightly sloped to allow moisture to drain off the top surface 216 of the primary cylindrical housing 212. The top surface 220 of the secondary cylindrical housing 214 can be slightly sloped or level.

Figure 2G:
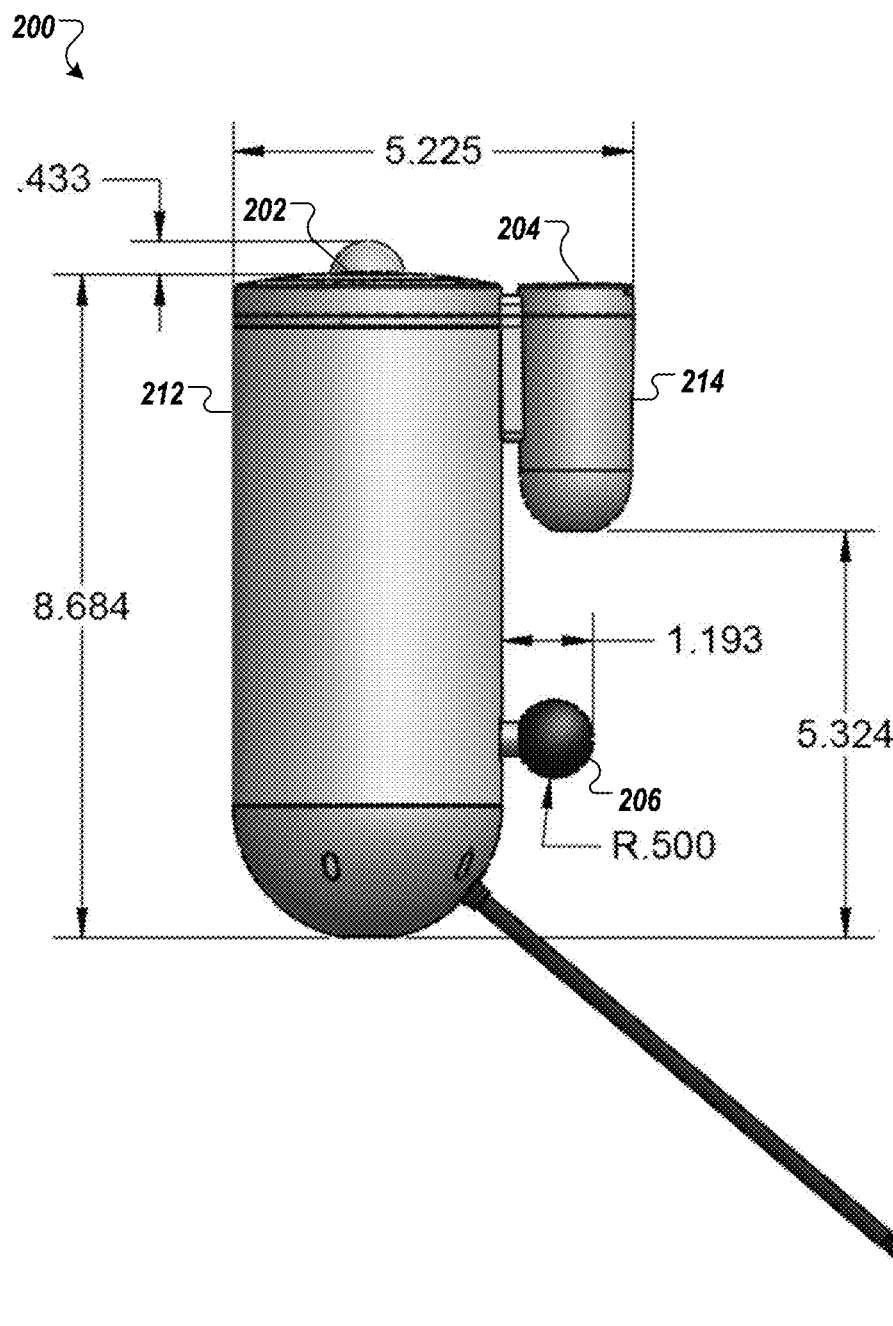
FIG. 2G is a first side view of a sky sensor device according to at least one embodiment.

FIG. 2G is a first side view of a sky sensor device 200 according to at least one embodiment. As illustrated in FIG. 2G, the sky sensor device 200 can have a width of approximately 5.255 inches between the two enclosures, with the primary cylindrical housing 212 having a height of approximately 8.684 and the secondary cylindrical housing 214 having a height of 3.36 inches. Alternatively, other dimensions of the sky sensor device 200 can be used. The transparent dome 218 can have a height of 0.492 inches. Alternatively, the transparent dome 218 can have different heights. As described above, the distance between the camera sensor 202 and the illuminance sensor 204 needs to be small enough to capture light data from the same approximate location yet far enough away to not interfere with one another.

Figure 2H:
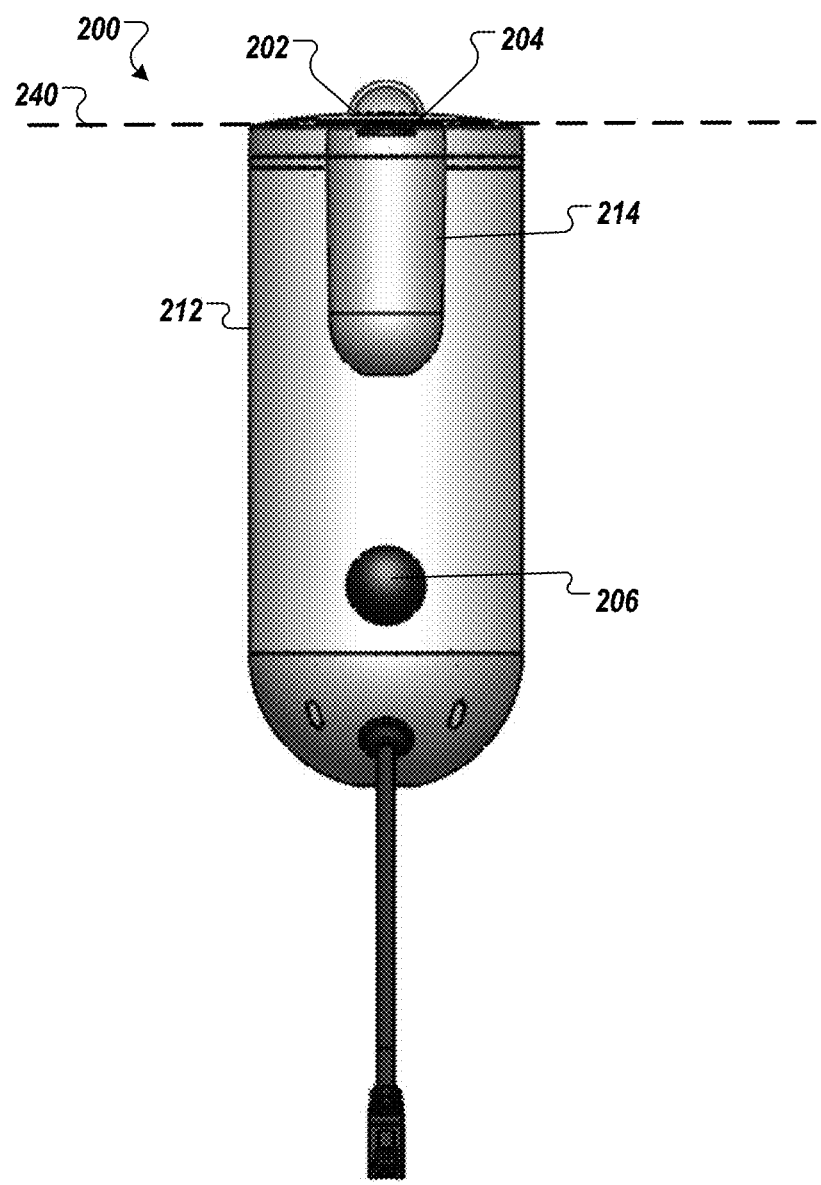
FIG. 2H is a second side view of a sky sensor device according to at least one embodiment.

FIG. 2H is a second side view of a sky sensor device 200 according to at least one embodiment. In at least one embodiment, the camera sensor 202 and the illuminance sensor 204 are located on the same plane 240.

As described above, a processing device can be coupled to the camera sensor 202 and the illuminance sensor 204. In at least one embodiment, the camera sensor 202 can capture a sequence of LDR images, and the processing device 236 coupled to the camera sensor 202 can discard images that do not have useful information (because they are oversaturated or under saturated) before generating an HDR image based on the sequence of LDR images. Since this is a finite amount of time to capture multiple LDR images and generate an HDR image, data from the illuminance sensor 204 can be averaged over the same amount of time. Once the HDR image is generated, the processing device 236 can extract a diffuse value (diffuse sky component) for generating a DNE value based on the illuminance value. In at least one embodiment, the global horizontal diffuse value is an integration over all the pixels to obtain the global horizontal diffuse value. In at least one embodiment, the processing device 236 can locate a region where the sun is located in the image and place a black disc over this region before determining the global horizontal diffuse value. In at least one embodiment, a region of interest algorithm can use known solar altitude and azimuth to locate an area in the image where the sun is expected to be, and a centroid algorithm can be used to find the brightest spot in the image as a central mass to isolate the center of the sun accurately. Once the point is located, the black disc can be placed at that point so that this region does not contribute to the global horizontal diffuse value. That region of interest allows the prevention of false positives in the image, such as if there is a reflection off another surface, such as a window.

In at least one embodiment, the sky sensor device 200 can include software executed by the processing device 236 to orient the camera sensor 202. The software can adjust the LDR images to align the LDR images with true north (a known cardinal direction). That is, the LDR images captured can be misaligned with a true-north alignment. True north can be hard to obtain using other sensors on a rooftop of a building due to magnetic interference from other components, for example. In at least one embodiment, the sky sensor device 200 includes an automated rotation algorithm that uses the region of interest to automatically rotate the HDR image to align itself with true north and south. For example, if the sky sensor device 200 is misaligned by a specified amount, such as between 0-20 degrees, the camera sensor 202 can correct the HDR image by that specified amount to align the images with a known coordinate system.

In at least one embodiment, the sky sensor device 200 includes other features, such as built-in heating to melt any snow accumulated on the sky sensor device. In at least one embodiment, the sky sensor device 200 includes an accelerometer for leveling. During installation, the sky sensor device 200 should be installed in a specific orientation and should be level. The accelerometer can detect when the sky sensor device is not level and can alert an operator of the sky sensor device, such as via the cloud service. In some cases, the wind or someone on the roof could move the sky sensor device 200 to no longer be level and/or oriented correctly. The sky sensor device 200 needs to face a certain direction based on whether it is located in the Northern Hemisphere or the Southern Hemisphere. In some cases, the software of the sky sensor device 200 can adjust the LDR images but, in other cases, the sky sensor device 200 can alert an operator that maintenance is needed to re-position and re-orient the sky sensor device 200. In at least one embodiment, the sky sensor device 200 includes built-in temperature and humidity sensing. The temperature and humidity sensors can be used to detect condensation inside the unit and alert an operator so that the operator can adjust the sky sensor device or address condensation. Alternatively, an alert system can alert the gateway or other devices.

In at least one embodiment, the illuminance sensor 204 is an integrated circuit (e.g., IC chip), and a diffuser can be placed above the sensors, such as a diffuser with Teflon® material or acrylic material, to attenuate the direct sun so that it doesn't saturate the IC chip. It should be noted that the diffuser can also simplify the circuitry, such as using a single gain setting for a range of the illuminance sensor(s). In at least one embodiment, the IC chip of the camera sensor 202 is coupled to a main processing board, which can include one or more processors (e.g., processing device 236). The IC chip can be coupled with a CSI cable. In at least one embodiment, the main processing board includes a multi-core processor in which one core is used for image processing and another core for managing the transfer of the images and other data to the cloud via an Ethernet cable. In at least one embodiment, the sky sensor device 200 can receive power and send or receive data over an Ethernet cable. In another embodiment, the sky sensor device 200 can send or receive data with other devices in the system, such as a gateway or other controller. In at least one embodiment, the sky sensor device 200 provides information for an electrochromic window system in the same building. In another embodiment, the sky sensor device 200 provides information that can be used for multiple buildings. In another embodiment, the electrochromic window system can receive information from a neighboring building for redundancy or failover purposes. In another embodiment, one home in a neighborhood can include the sky sensor device, and it can be used for multiple homes in the neighborhood.

In at least one embodiment, as illustrated in FIGS. 2A-2H, an attachment mechanism, such as a mounting ball, can be used to mount the sky sensor device 200. The mounting ball can mount to a standard rooftop mast system with ease of leveling using an articulating arm mount, such as an off-the-shelf articulating arm. The articulating arm can be used for both leveling and direction of the sky sensor device for alignment with respect to true north or true south. Alternatively, other mounting mechanisms can be used to secure the sky camera to a mast system or other structures on a roof of a structure. In at least one embodiment, a package in which the sky sensor device 200 is stored can contain a leveling mechanism, such as a foam piece to protect during shipping and level the sky sensor device 200 during installation. FIGS. 3A-3D illustrate and describe some examples of how the sky sensor device 200 can be mounted.

Figure 3B:
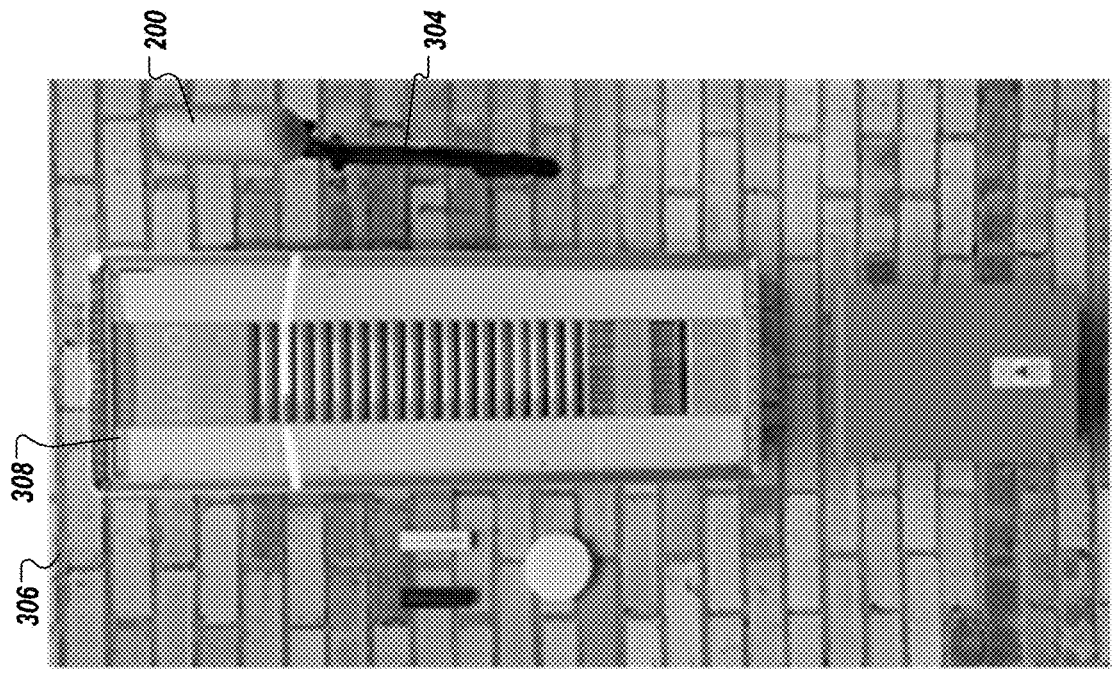
FIG. 3B is a side view of the sky sensor device mounted on a wall near a cabinet of drivers according to at least one embodiment.
Figure 3A:
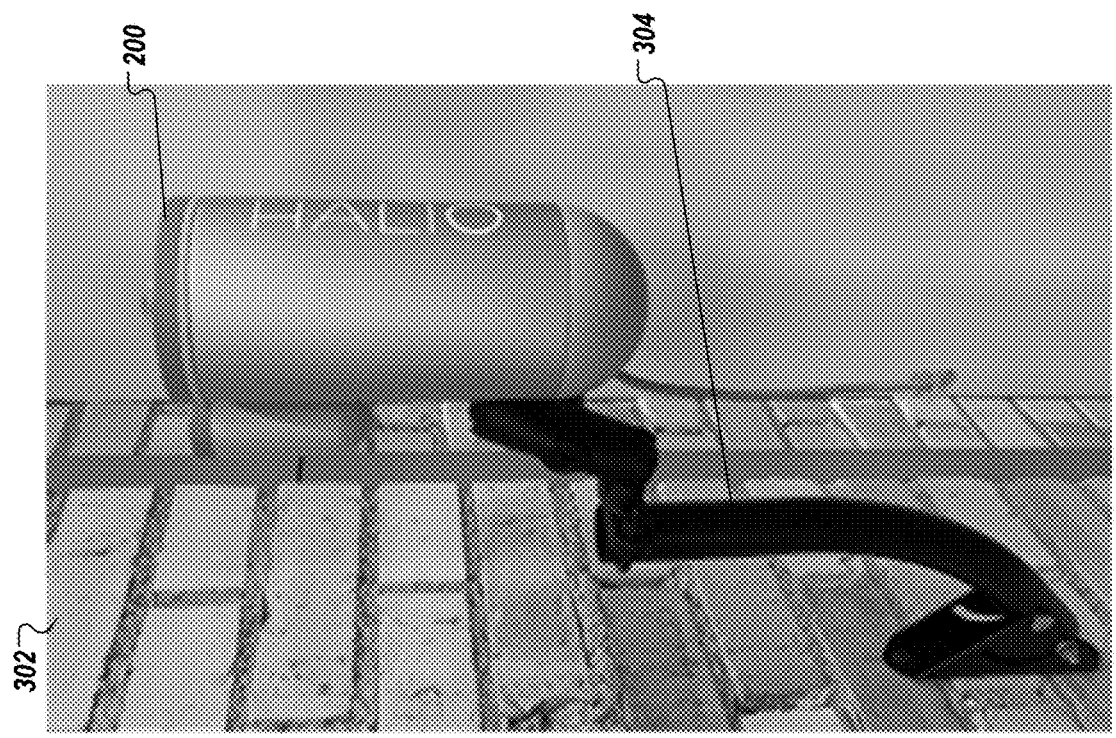
FIG. 3A is a side view of the sky sensor device mounted on a wall with a mounting bracket according to at least one embodiment.

FIG. 3A is a side view of the sky sensor device 200 mounted on a wall 302 with a mounting bracket 304 according to at least one embodiment.

FIG. 3B is a side view of the sky sensor device 200 mounted on a wall 306 near a cabinet 308 of drivers according to at least one embodiment.

Figure 3D:
FIG. 3D is a perspective view of multiple sky sensor devices mounted on an articulating arm on a rooftop mast system according to at least one embodiment.
Figure 3C:
FIG. 3C is a perspective view of the sky sensor device mounted on an articulating arm on a rooftop mast system according to at least one embodiment.

FIG. 3C is a perspective view of the sky sensor device 200 mounted on an articulating arm 310 on a rooftop mast system 312 according to at least one embodiment.

FIG. 3D is a perspective view of multiple sky sensor devices 200 mounted on an articulating arm 314 on a rooftop mast system 316 according to at least one embodiment. As illustrated in FIG. 3D, the sky sensor device 200 can be mounted to a horizontal portion 318 of the rooftop mast system 316, a vertical portion 320 of the rooftop mast system 316, or both.

FIGS. 4A-4E show screen captures of a video of the HDR images accumulated by the image sensor and direct normal and diffuse horizontal illuminance values in a top graph and tint levels in a bottom graph according to at least one embodiment.

Figure 4A:
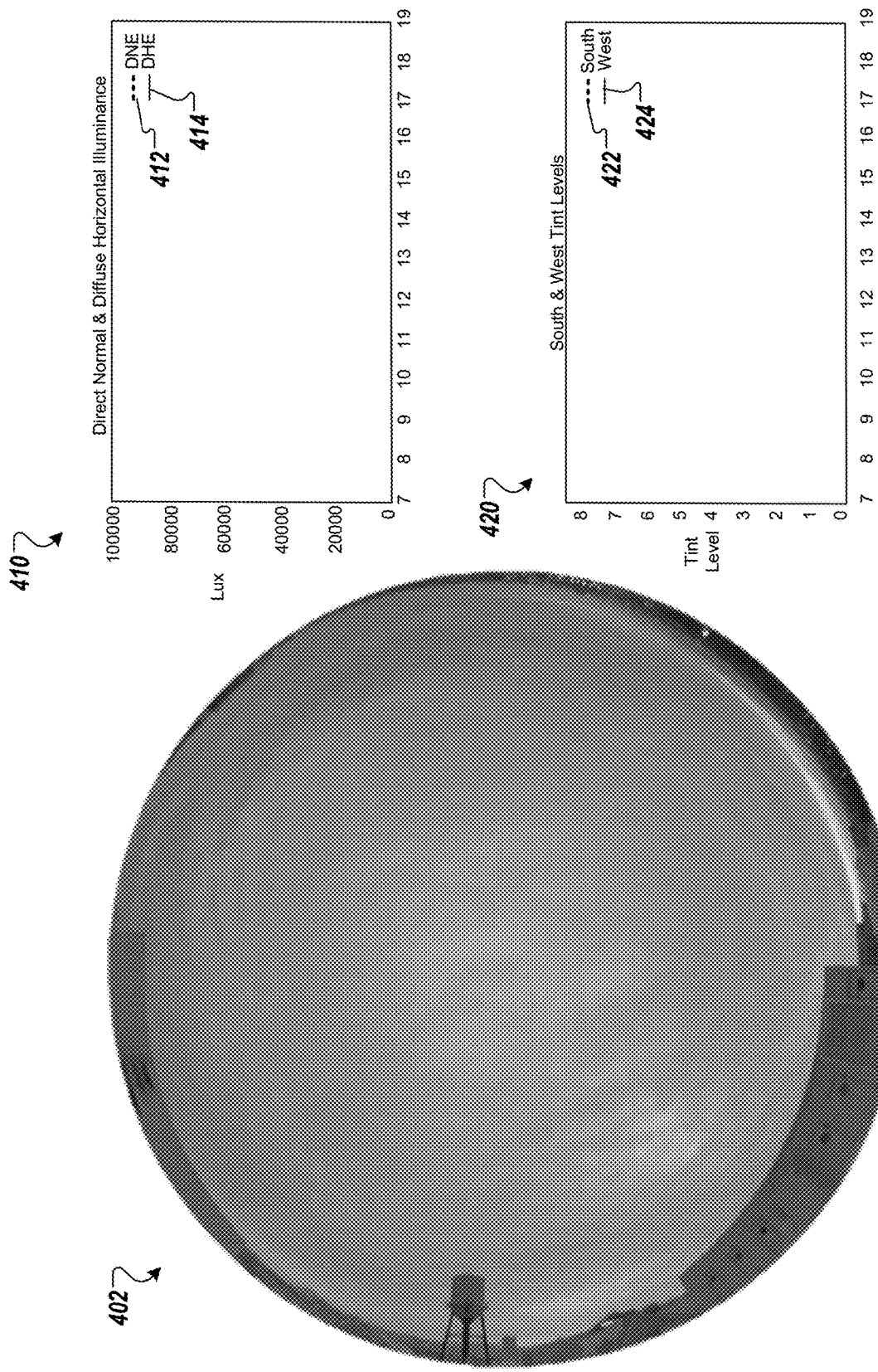
FIGS. 4A-4E show screen captures of a video of high dynamic range (HDR) images accumulated by the image sensor and the direct normal and diffuse horizontal illuminance measured by the sky sensor device over time in a top graph and tint levels on a south-facing façade and a west-facing façade according to at least one embodiment.

FIG. 4A shows a first HDR image 402 as a first screen capture in a video of HDR images accumulated by the camera sensor 202 at a start time. A top graph 410 in FIG.

4A illustrates values of the direct normal illuminance (DNE) 412 and the diffuse horizontal illuminance (DHE) 414 measured by the sky sensor device 200. A bottom graph 420 in FIG. 4A illustrates tint level values for two different façades, including a south-facing façade 422 and a west-facing façade 424. The top graph 410 and the bottom graph 420 do not have any measured values or tint level values of the electrochromic windows.

Figure 4B:
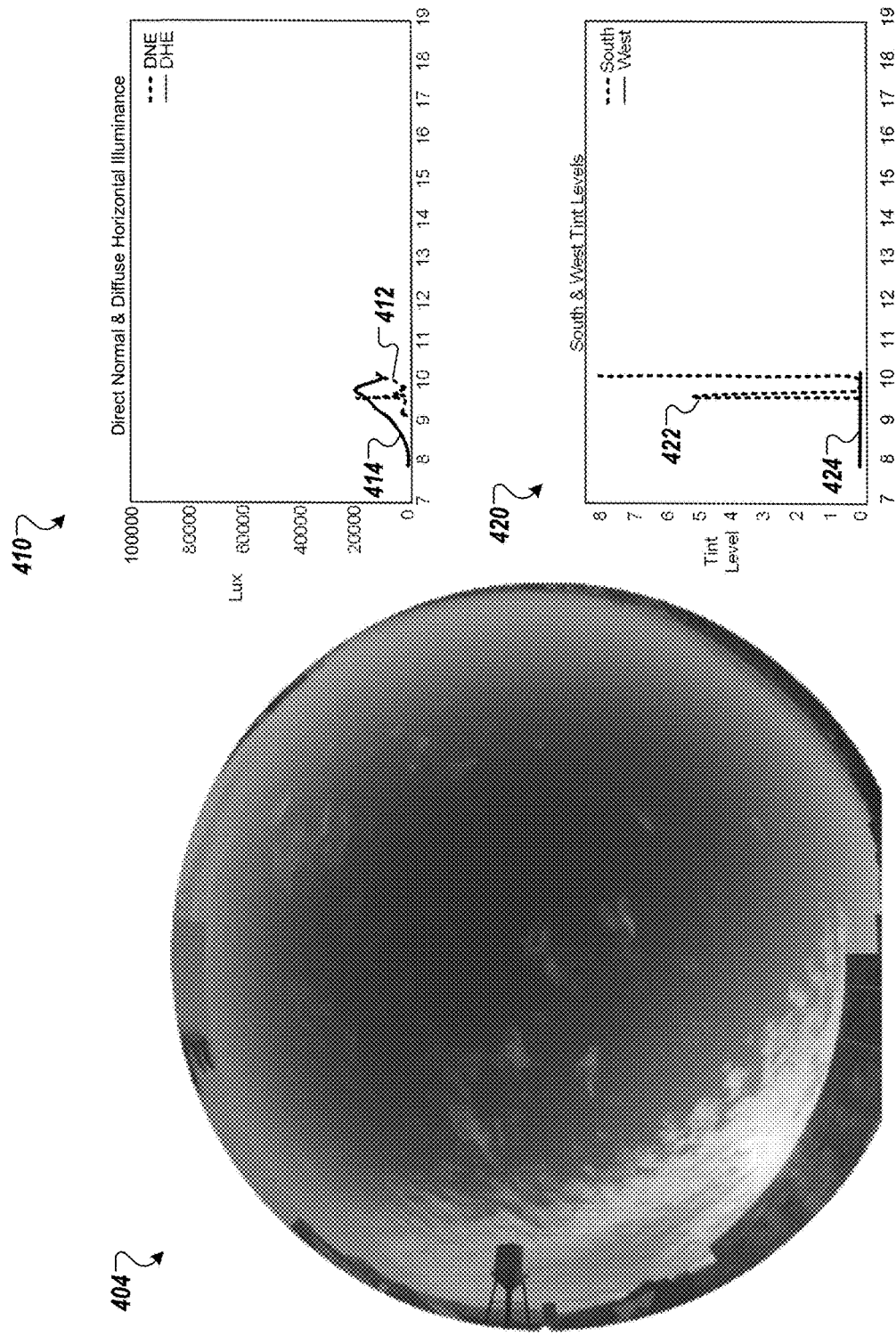

FIG. 4B shows a second HDR image 404 as a second screen capture in a video of HDR images accumulated by the camera sensor 202 up to a first time after the start time. The top graph 410 in FIG. 4B illustrates values of the DNE 412 and the DHE 414 measured by the sky sensor device 200. The bottom graph 420 in FIG. 4B illustrates tint level values for the south-facing façade 422 and the west-facing façade 424.

Figure 4C:
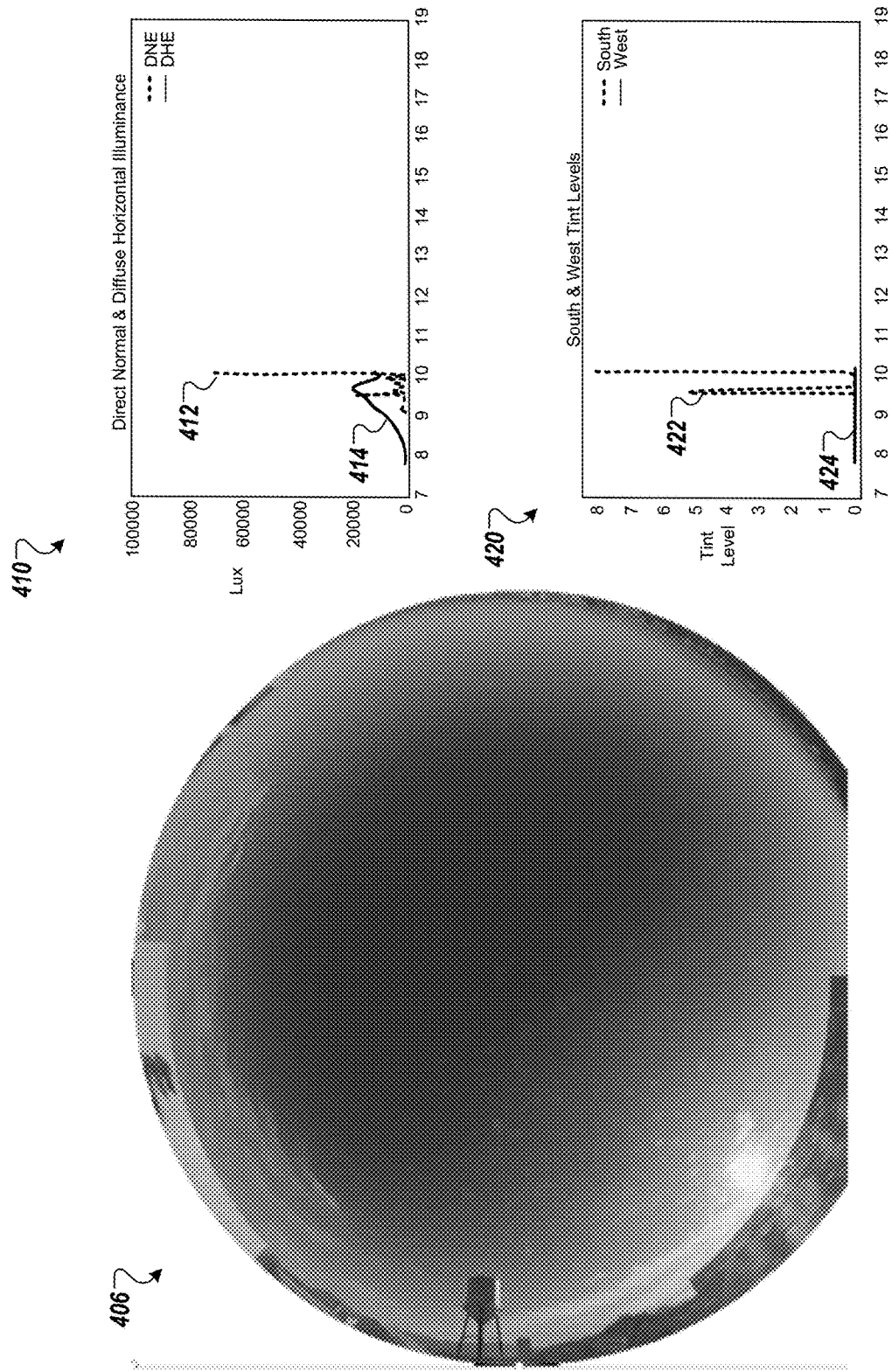

FIG. 4C shows a third HDR image 406 as a third screen capture in a video of HDR images accumulated by the camera sensor 202 up to a second time after the first time. The top graph 410 in FIG. 4C illustrates values of the DNE 412 and the DHE 414 measured by the sky sensor device 200. The bottom graph 420 in FIG. 4C illustrates tint level values for the south-facing façade 422 and the west-facing façade 424.

Figure 4D:
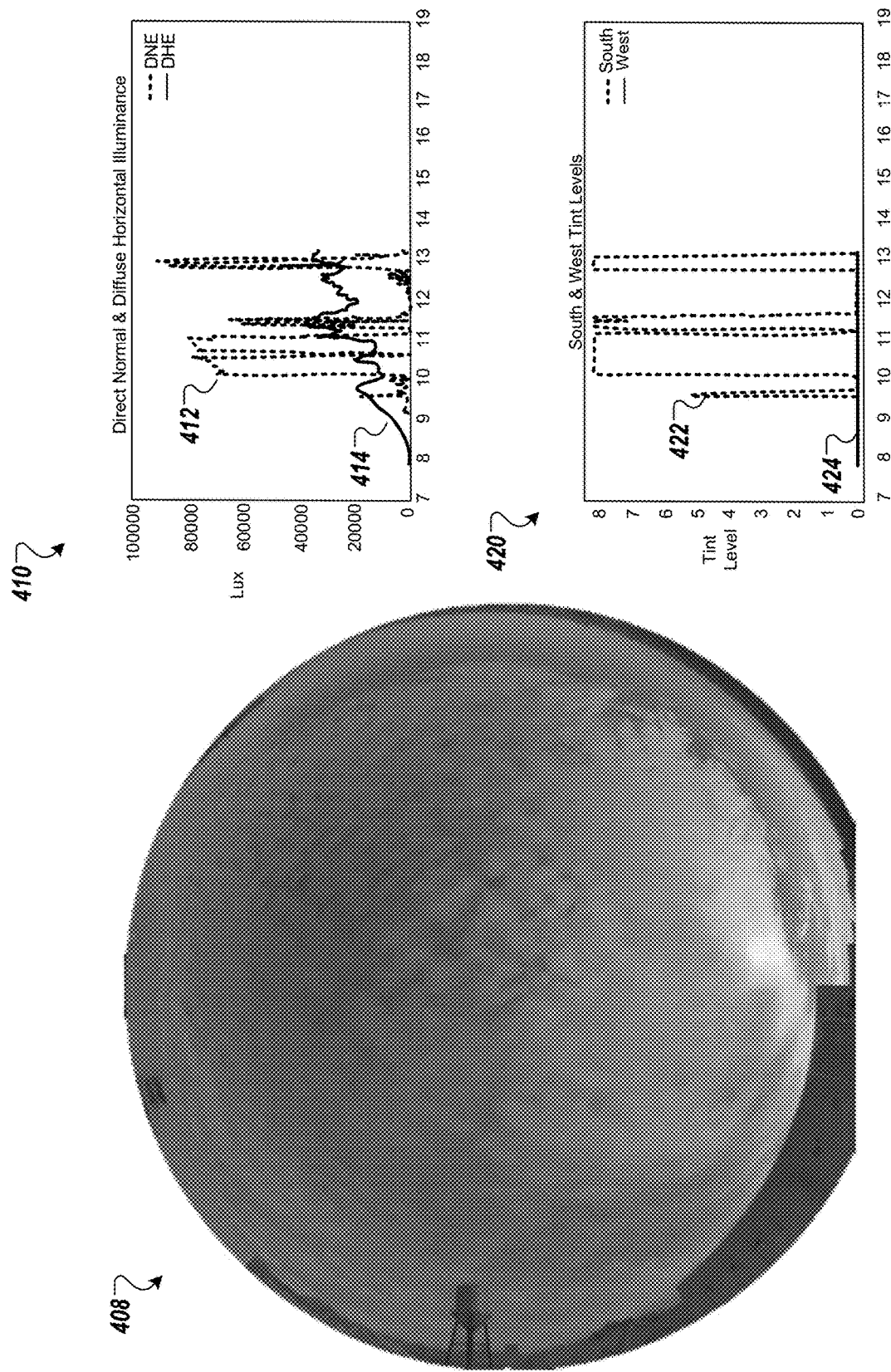

FIG. 4D shows a fourth HDR image 408 as a fourth screen capture in a video of HDR images accumulated by the camera sensor 202 up to a third time after the second time. The top graph 410 in FIG. 4D illustrates values of the DNE 412 and the DHE 414 measured by the sky sensor device 200. The bottom graph 420 in FIG. 4D illustrates tint level values for the south-facing façade 422 and the west-facing façade 424.

Figure 4E:
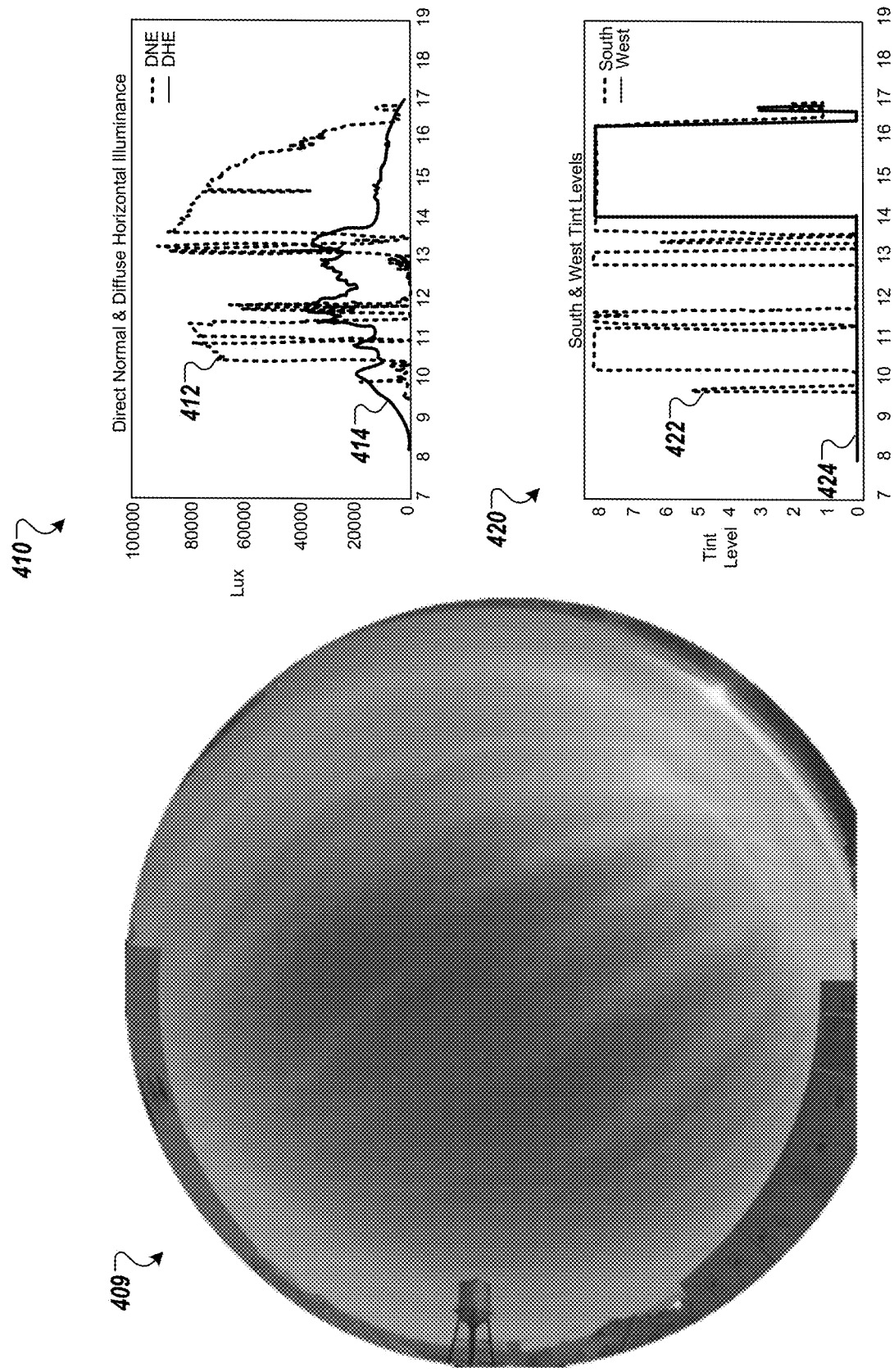

FIG. 4E shows a fifth HDR image 409 as a fifth screen capture in a video of HDR images accumulated by the camera sensor 202 up to a fourth time after the third time. The top graph 410 in FIG. 4E illustrates values of the DNE 412 and the DHE 414 measured by the sky sensor device 200. The bottom graph 420 in FIG. 4E illustrates tint level values for the south-facing façade 422 and the west-facing façade 424.

As illustrated over time in the screenshots of FIGS. 4A-4E, the west-facing façade is clear most of the day, and then the sun starts to hit the west-facing façade, and the tint level is increased. These images and data can be presented to a user in some cases. For example, this visual data can be more informative to a user than analog irradiance data from a pyranometer.

As described above, the sky sensor device 200 can include software to rotate images captured by the camera sensor 202. That is, the LDR images captured can be misaligned with a true-north alignment, and the software can adjust the LDR images to align the LDR images with true north (a known cardinal direction), set forth in FIGS. 5A-5C. For example, although the sky sensor device 200 can be mounted such that it is oriented on a true north-south axis, it is difficult for installers to achieve accurate orientation in the field. Some features rely on an accurate north-south orientation in the images being captured. As such, the HDR images need to be adjusted such that the images are oriented with a true north-south axis if the sky sensor device 200 is not oriented by the installed or knocked out of alignment by wind or another force. Also, there are scenarios where specular reflections occur in the images that can cause false positives when identifying an imaged sun in an HDR image. The accurate location of the imaged sun is used for proper rotational correction for aligning the image with the true north-south axis. Also, the accurate location of the image sun is needed to draw a black disk over the circumsolar region when measuring values of diffuse horizontal illumination from the HDR values, as described herein.

Figure 5A:
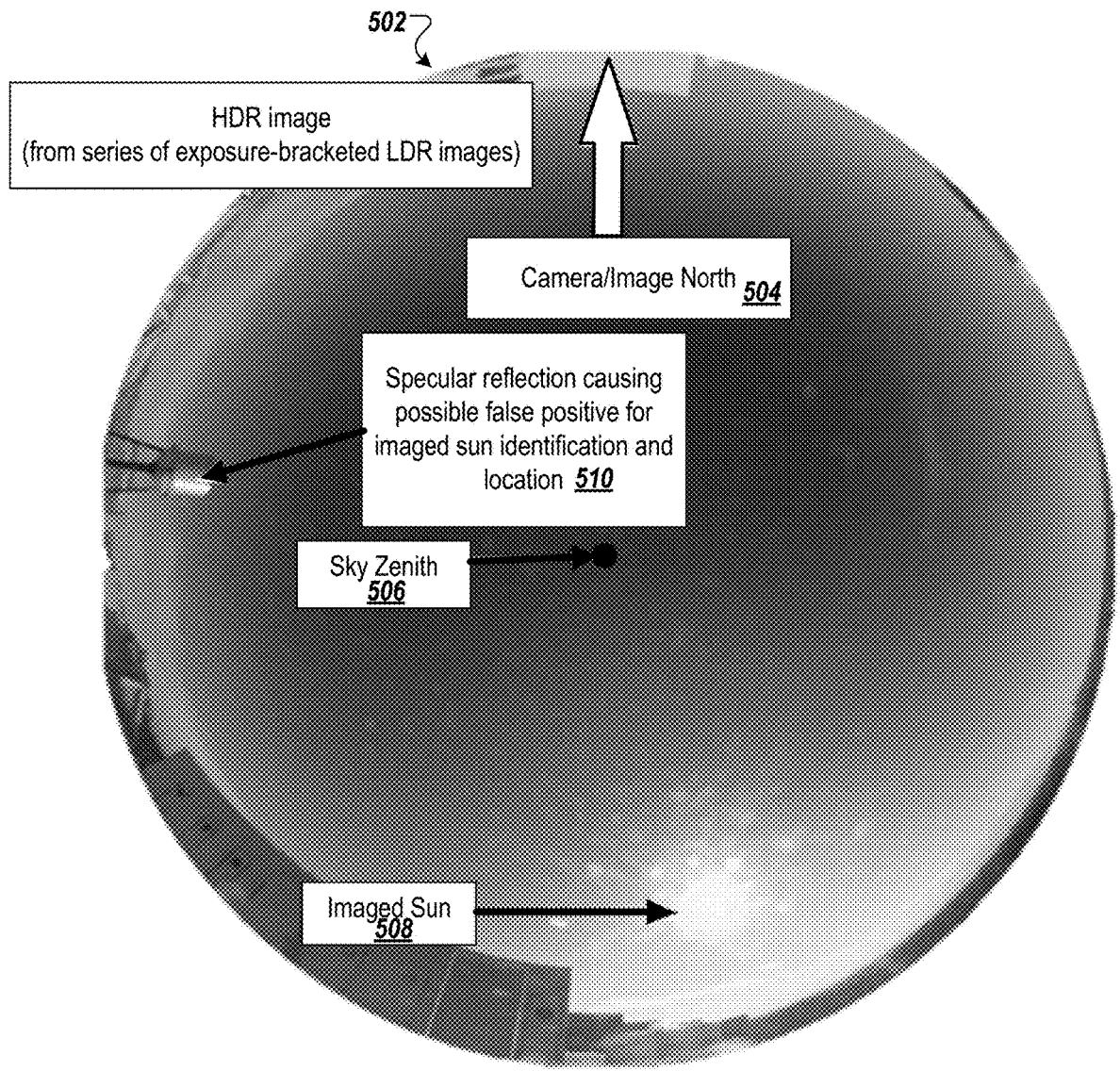
FIG. 5A illustrates an HDR image from a series of exposure-bracketed low dynamic range (LDR) images according to at least one embodiment.

FIG. 5A illustrates an HDR image 502 from a series of exposure-bracketed LDR images according to at least one embodiment. The HDR image 502 has a camera north or image north 504 and a sky zenith 506. The HDR image 502 has an imaged sun 508 and a specular reflection 510 on an object in the image. The specular reflection 510 can cause possible false positives for imaged sun identification and location.

In at least one embodiment, the sky sensor device 200 includes an automated rotation algorithm that uses a region of interest (ROI) to automatically rotate the HDR image 502 to align itself with true north and south. For example, if the sky sensor device 200 is misaligned by a specified amount, such as between 0-20 degrees, the camera sensor 202 can correct the HDR image 502 by that specified amount to align the images with a known coordinate system, as described below. In at least one embodiment, LDR images are captured as a series of bracketed exposures and are used to generate the HDR image 502. An example of an LDR image is illustrated in FIG. 5B.

Figure 5B:
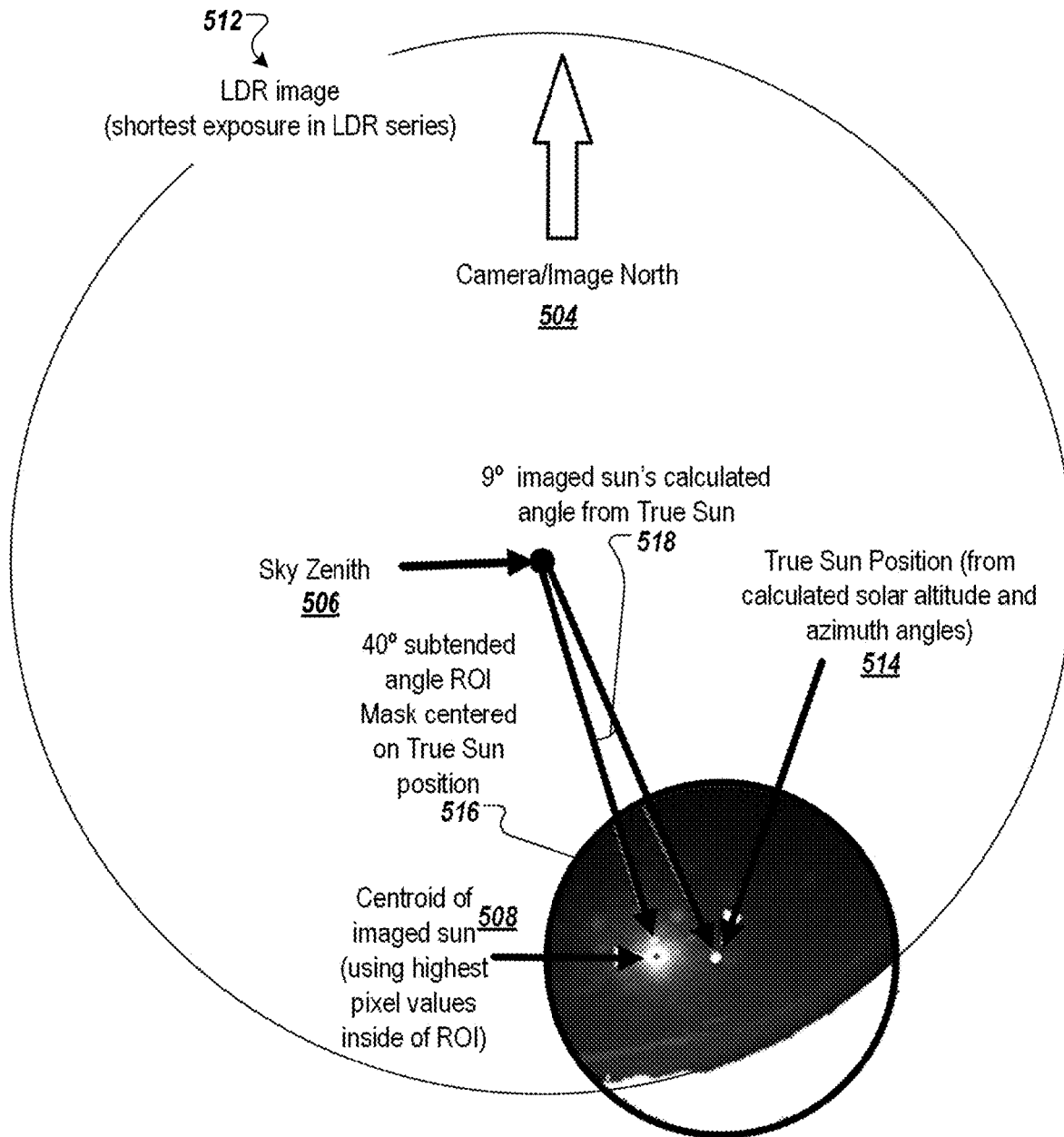
FIG. 5B illustrates an LDR image from a series of exposure-bracketed LDR images according to at least one embodiment.
Figure 5C:
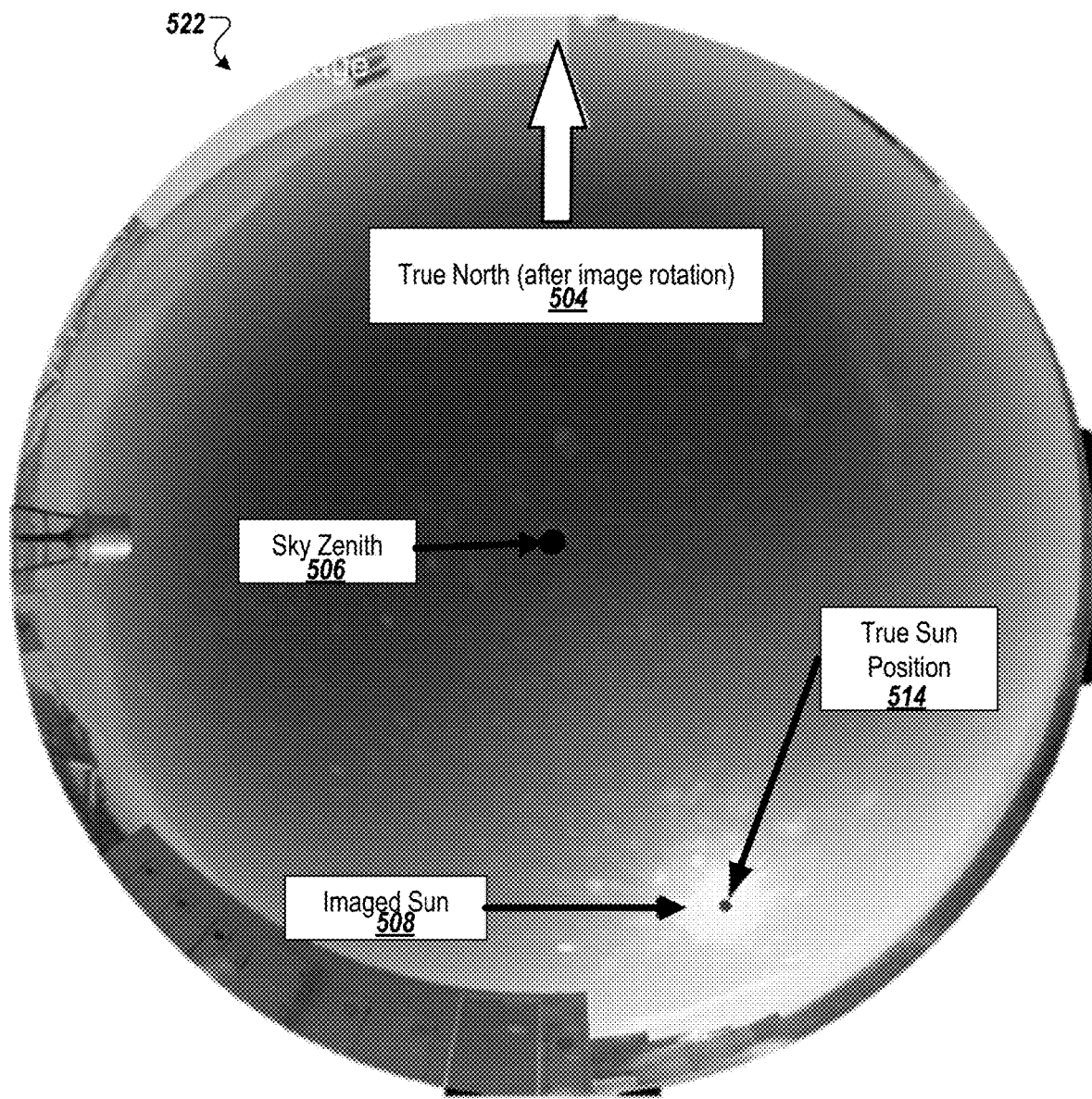
FIG. 5C illustrates an HDR image after rotation according to at least one embodiment.

FIG. 5B illustrates an LDR image 512 from a series of exposure-bracketed LDR images according to at least one embodiment. The LDR image 512 with the fastest exposure time provides an imaged sun 508 with the least amount of over-exposed pixels within a circumsolar region. The software can assume that the LDR image 512 is oriented correctly along the true north-south axis and can locate a true sun position 514 using pre-calculated solar altitude and azimuth values. This information can be stored in the memory of the sky sensor device 200. The LDR image 512 can be transformed to grayscale. The software can create a circular region of interest (ROI) mask 516 at a predetermined radius from a true sun's location. The software can use a threshold filter on the ROI mask 516 to find the brightest pixels. The software can calculate a centroid of a grouping of bright pixels. The software calculates an angle 518, relative to the sky's zenith 506, between the true sun's location (514) and the centroid location assumed the image sun's center (508). In at least one embodiment, the software can determine an angle 518 (e.g., 9 degrees in the illustrated example) between the sky zenith 506 and the true sun's location and the centroid of the imaged sun and the sky zenith. The ROI mask 516, which is centered on the true sun position (514) and calculated from the solar altitude and azimuth angles stored in memory, can be at a subtended angle (e.g., 40 degrees). As illustrated in FIG. 5C, the software can rotate the HDR image 502 by the calculated angle between the imaged sun location and the true sun location to obtain a rotated HDR image 522.

In at least one embodiment, the subtended angle of the ROI mask must be large enough to enclose the imaged sun. In this example, it is assumed that the camera will be installed within 20 degrees east/west of the true north-south axis, and/or the camera will not be knocked out of orientation beyond these ROI boundary limits. That is, the imaged sun 508 must be located within the ROI mask 516 in order to rotate the HDR image 502 to the rotated HDR image 522. In the example of FIGS. 5A-5C, the subtended angle is 40 degrees. Alternatively, other subtended angles can be used.

Figure 6:
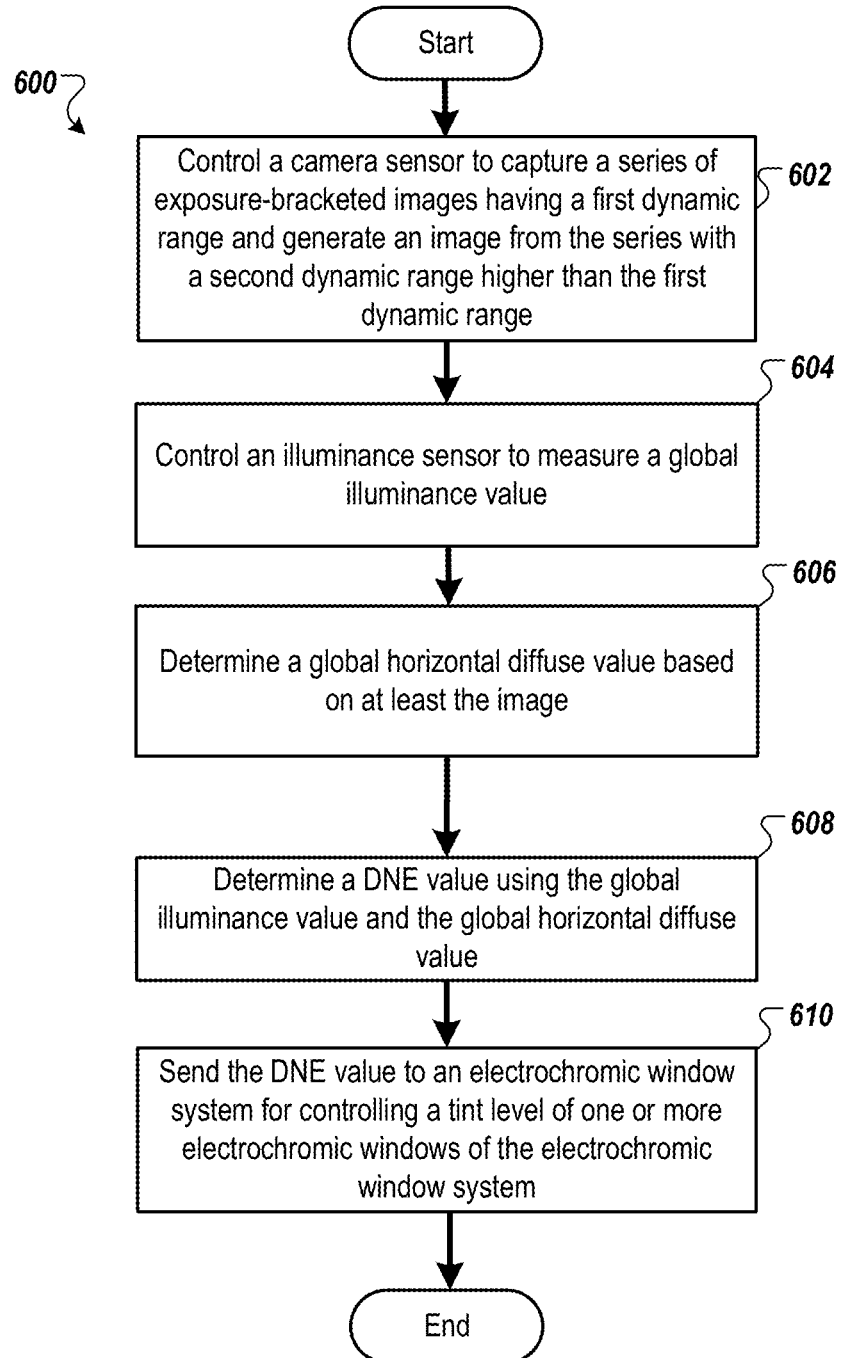
FIG. 6 is a flow diagram of a method of determining a DNE value using images and illuminance to control an electrochromic window's tint level according to one embodiment.

FIG. 6 is a flow diagram of a method 600 of determining a DNE value using images and illuminance for controlling a tint level of an electrochromic window according to one embodiment. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the sky sensor device 124 of FIG. 1. In another embodiment, the method 600 is performed by the sky sensor device 200 of FIGS. 2A-3C. In another embodiment, the method 600 is performed by a processing device of the sky sensor device 200 or a processor core of the processing device. Although shown in a particular sequence or order, the order of the processes can be modified unless otherwise specified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 6, the method 600 begins by the processing logic controlling a camera sensor to capture a series of exposure-bracketed images having a first dynamic range and generate an image from the series of exposure-bracketed images (block 602). The image has a second dynamic range higher than the first dynamic range. The processing logic controls an illuminance sensor to measure a global illuminance value (block 604). The processing logic determines a global horizontal diffuse value based on at least the image (block 606). The processing logic determines a DNE value using the global illuminance and horizontal diffuse values (block 608). The processing logic sends the DNE value to an electrochromic window system for controlling a tint level of one or more electrochromic windows of the electrochromic window system (block 610), and the method 600 ends.

In a further embodiment, the processing logic determines a first location of the sky zenith in the image. The processing logic determines a second location in the image representing an expected location of the sun using solar altitude and azimuth values. The processing logic creates an ROI mask in the image at a predetermined radius from the second location. The processing logic determines a centroid location of a set of pixels within the ROI mask having brighter pixel values than other pixels in the ROI mask. The processing logic determines an angle between the second and the centroid locations relative to the sky's zenith. The processing logic rotates the image by the angle to obtain a rotated image.

In a further embodiment, the processing logic determines that the angle satisfies a threshold condition representing a misaligned camera sensor. The processing logic sends a notification to a user of the misaligned camera sensor responsive to the angle satisfying the threshold condition.

Figure 7:
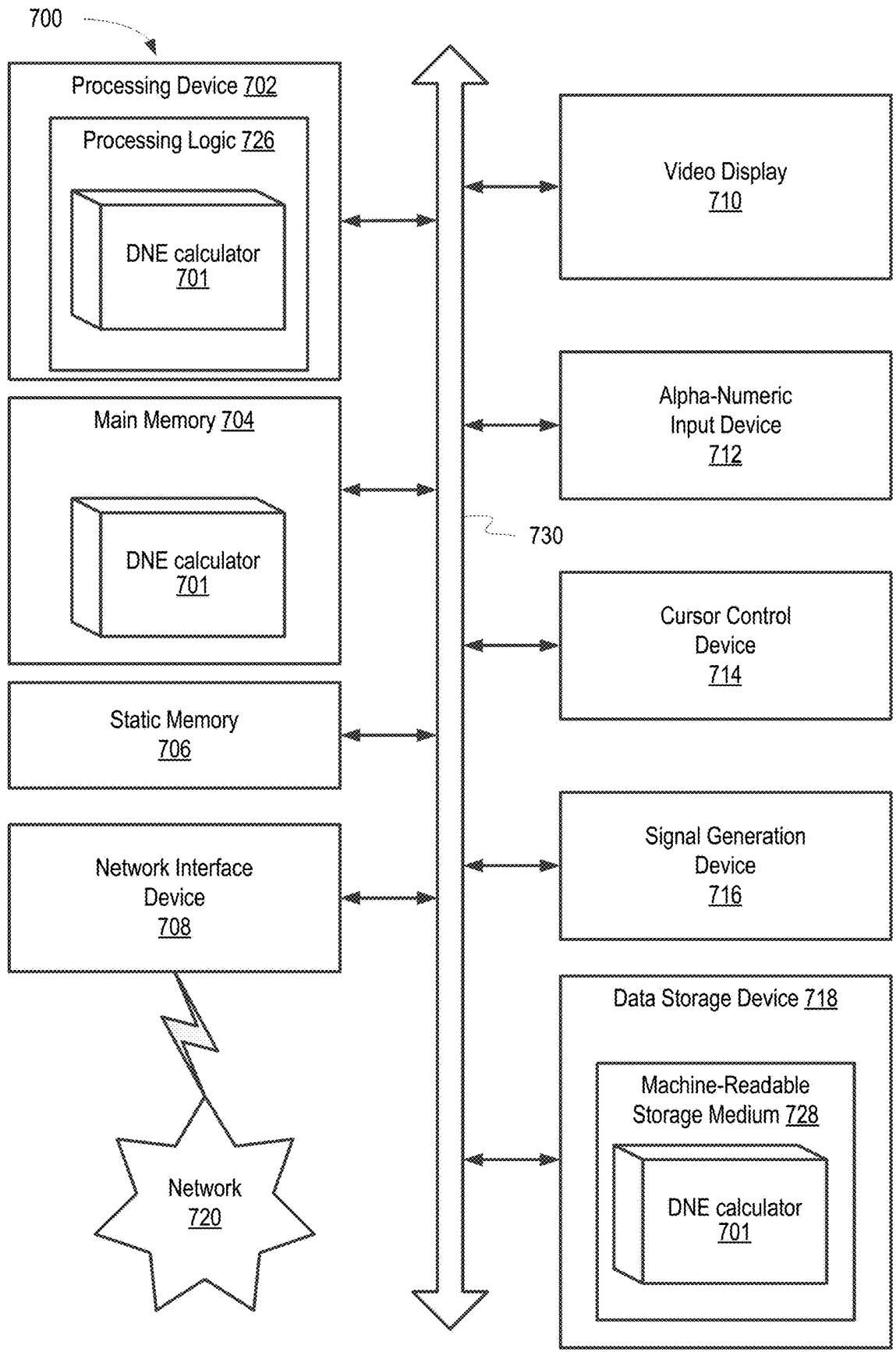
FIG. 7 illustrates a diagrammatic representation of a machine in the example form of a computer system, including a set of instructions executable by a computer system for determining a DNE value for controlling a tint level of an electrochromic window according to any one or more of the methodologies discussed herein.

FIG. 7 illustrates a diagrammatic representation of a machine in the example form of a computer system, including a set of instructions executable by a computer system 700 for determining a DNE value for controlling a tint level of an electrochromic window according to any one or more of the methodologies discussed herein. In one embodiment, the computer system 700 may include instructions to enable execution of the processes and corresponding components shown and described in connection with FIGS. 1-6.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, a switch or a bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application-specific integrated circuit (ASIC), a field-programmable gate array (FPGA), a digital signal processor (DSP), a network processor, or the like. In various implementations of the present disclosure, the processing device 702 is configured to execute instructions for distributed EMS 102 for performing the operations and processes described herein.

The computer system 700 may further include a network interface device 708. The computer system 700 also may include a video display unit 710 (e.g., a light-emitting diode (LED) display, a liquid crystal display (LCD), or a cathode ray tube (CRT)), a human interface device 712 (e.g., keyboard, gesture-control input device, touchpad, touchscreen, a voice-controlled speaker, an alphanumeric input device, or the like), a cursor control device 714 (e.g., a mouse, touchpad, touchscreen, or the like), and a signal generation device 716 (e.g., a speaker).

The data storage device 718 may include a computer-readable storage medium 728 (or machine-readable medium) on which is stored one or more sets of instructions of the distributed EMS 102 embodying any one or more of the methodologies or functions described herein. The instructions may also reside, completely or at least partially, within the main memory 704 and/or within processing logic 726 of the processing device 702 during execution thereof by the computer system 700, the main memory 704, and the processing device 702 also constituting computer-readable media. The processing logic 726 can implement a DNE calculator 701 that performs the operations described herein. In at least one embodiment, the DNE calculator 701 performs the method 600 of FIG. 6. The DNE calculator 701 can perform other operations described herein.

The instructions may further be transmitted or received over a network 720 via the network interface device 708. While the computer-readable storage medium 728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding, or carrying a set of instructions for execution by the machine and that causes the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth to provide a good understanding of several embodiments of the present disclosure. In the above description, numerous details are set forth. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely presented as examples. Particular implementations may vary from these example details and still be contemplated to be within the scope of the present disclosure.

It will be apparent, however, to one of ordinary skill in the art having the benefit of this disclosure that embodiments of the disclosure may be practiced without these specific details. In some instances, well-known structures and devices are shown in block diagram form rather than in detail to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing," "applying," "determining," "generating," or the like refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for various systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

The terms "over," "under," "between," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

It is to be understood that the above description is intended to be illustrative and not restrictive. Many other embodiments will be apparent to those of skill in the art upon reading and understanding the above description. Therefore, the disclosure scope should be determined with reference to the appended claims, along with the full scope of equivalents to which such claims are entitled.

What is claimed is:

1. A processing device comprising:
a first interface coupled to a camera sensor;
a second interface coupled to an illuminance sensor; and
a processor core coupled to the first interface and the second interface, wherein the processor core is to:
control the camera sensor to capture a series of exposure-bracketed images having a first dynamic range and generate an image from the series of exposure-bracketed images, the image having a second dynamic range higher than the first dynamic range;
control the illuminance sensor to measure a global illuminance value;
determine a global horizontal diffuse value based on at least the image; and
determine a direct normal illuminance (DNE) value using the global illuminance value and the global horizontal diffuse value.

2. The processing device of claim 1, wherein the processor core is further to send the DNE value to an electrochromic window system for controlling a tint level of one or more electrochromic windows of the electrochromic window system.

3. The processing device of claim 1, wherein the processor core is further to:
determine a first location of the sky's zenith in the image;
determine a second location in the image representing an expected location of the sun using solar altitude and azimuth values;

create a region of interest (ROI) mask in the image at a predetermined radius from the second location;
determine a centroid location of a set of pixels within the ROI mask having brighter pixel values than other pixels in the ROI mask;
determine an angle, relative to the sky's zenith, between the second location and the centroid location; and
rotate the image by the angle to obtain a rotated image.

4. The processing device of claim 3, wherein the processor core is further to:
determine that the angle satisfies a threshold condition representing a misaligned camera sensor; and
send, to a user, a notification of the misaligned camera sensor responsive to the angle satisfying the threshold condition.

5. The processing device of claim 1, wherein the DNE value is an amount of illuminance in the visible spectrum and is indicative of a sky condition in a field of view of the camera sensor, the sky condition relating to glare from the sun on a window near the camera sensor.

6. The processing device of claim 5, wherein the processor core is to report the sky condition to an electrochromic window system for controlling a tint level of one or more electrochromic windows of the electrochromic window system based on the sky condition.

7. The processing device of claim 1, wherein the processor core is further to:
control the illuminance sensor to measure multiple global illuminance values;
average the multiple global illuminance values to determine an average global illuminance value; and
determine the direct normal illuminance (DNE) value using the average global illuminance value and the global horizontal diffuse value.

8. A method comprising:
controlling a camera sensor to capture a series of exposure-bracketed images having a first dynamic range and generate an image from the series of exposure-bracketed images, the image having a second dynamic range higher than the first dynamic range;
controlling an illuminance sensor to measure a global illuminance value;
determining a global horizontal diffuse value based on at least the image; and
determining a direct normal illuminance (DNE) value using the global illuminance value and the global horizontal diffuse value.

9. The method of claim 8, further comprising sending the DNE value to an electrochromic window system for controlling a tint level of one or more electrochromic windows of the electrochromic window system.

10. The method of claim 8, further comprising:
determining a first location of the sky's zenith in the image;
determining a second location in the image representing an expected location of the sun using solar altitude and azimuth values;
creating a region of interest (ROI) mask in the image at a predetermined radius from the second location;
determining a centroid location of a set of pixels within the ROI mask having brighter pixel values than other pixels in the ROI mask;
determining an angle, relative to the sky's zenith, between the second location and the centroid location; and
rotating the image by the angle to obtain a rotated image.

11. The method of claim 10, further comprising:
determining that the angle satisfies a threshold condition representing a misaligned camera sensor; and
sending a notification to a user of the misaligned camera sensor responsive to the angle satisfying the threshold condition.

12. The method of claim 8, wherein the DNE value is an amount of illuminance in the visible spectrum and is indicative of a sky condition in a field of view of the camera sensor, the sky condition relating to glare from the sun on a window near the camera sensor.

13. The method of claim 12, further comprising reporting the sky condition to an electrochromic window system for controlling a tint level of one or more electrochromic windows of the electrochromic window system based on the sky condition.

14. The method of claim 8, further comprising:
controlling the illuminance sensor to measure multiple global illuminance values;
averaging the multiple global illuminance values to determine an average global illuminance value; and
determining the direct normal illuminance (DNE) value using the average global illuminance value and the global horizontal diffuse value.

15. A computing system comprising:
a memory; and
a processing device operatively coupled to the memory, wherein the processing device is to:
control a camera sensor to capture a series of exposure-bracketed images having a first dynamic range and generate an image from the series of exposure-bracketed images, the image having a second dynamic range higher than the first dynamic range;
control an illuminance sensor to measure a global illuminance value;
determine a global horizontal diffuse value based on at least the image; and
determine a direct normal illuminance (DNE) value using the global illuminance value and the global horizontal diffuse value.

16. The computing system of claim 15, wherein the processing device is further to send the DNE value to an electrochromic window system for controlling a tint level of one or more electrochromic windows of the electrochromic window system.

17. The computing system of claim 15, wherein the processing device is further to:
determine a first location of the sky's zenith in the image;
determine a second location in the image representing an expected location of the sun using solar altitude and azimuth values;
create a region of interest (ROI) mask in the image at a predetermined radius from the second location;
determine a centroid location of a set of pixels within the ROI mask having brighter pixel values than other pixels in the ROI mask;
determine an angle, relative to the sky's zenith, between the second location and the centroid location; and
rotate the image by the angle to obtain a rotated image.

18. The computing system of claim 17, wherein the processing device is further to:
determine that the angle satisfies a threshold condition representing a misaligned camera sensor; and
send, to a user, a notification of the misaligned camera sensor responsive to the angle satisfying the threshold condition.

19. The computing system of claim 15, wherein the DNE value is an amount of illuminance in the visible spectrum and is indicative of a sky condition in a field of view of the camera sensor, the sky condition relating to glare from the sun on a window near the camera sensor, wherein the processing device is to report the sky condition to an electrochromic window system for controlling a tint level of one or more electrochromic windows of the electrochromic window system based on the sky condition.

20. The computing system of claim 15, wherein the processing device is further to:
- control the illuminance sensor to measure multiple global illuminance values;
- average the multiple global illuminance values to determine an average global illuminance value; and
- determine the direct normal illuminance (DNE) value using the average global illuminance value and the global horizontal diffuse value.

\* \* \* \* \*